United States Patent
Takasawa et al.

(10) Patent No.: US 8,607,254 B2
(45) Date of Patent: Dec. 10, 2013

(54) CARTRIDGE TRANSPORTING DEVICE

(75) Inventors: Takeharu Takasawa, Kanagawa (JP);
Takeshi Kubo, Kanagawa (JP);
Naofumi Goto, Kanagawa (JP); Akira Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/462,559

(22) Filed: May 2, 2012

(65) Prior Publication Data

US 2012/0301252 A1  Nov. 29, 2012

(30) Foreign Application Priority Data

May 25, 2011 (JP) ................ 2011-116658

(51) Int. Cl.
*G11B 17/04* (2006.01)
*G11B 17/22* (2006.01)

(52) U.S. Cl.
USPC ......................... 720/632; 369/30.7

(58) Field of Classification Search
USPC ............ 369/30.64, 30.67, 30.68, 30.7, 30.75;
720/632, 633, 634, 635, 657
See application file for complete search history.

(56) References Cited

U.S. PATENT DOCUMENTS

| | | | | |
|---|---|---|---|---|
| 5,602,695 A | * | 2/1997 | Nishijima et al. | 360/94 |
| 5,822,149 A | * | 10/1998 | Takase et al. | 360/94 |
| 7,777,984 B2 | * | 8/2010 | Murase et al. | 360/85 |
| 2011/0296446 A1 | * | 12/2011 | Takasawa et al. | 720/621 |

FOREIGN PATENT DOCUMENTS

| | | | | |
|---|---|---|---|---|
| JP | 09259495 A | * | 10/1997 | |
| JP | 11-039753 | | 2/1999 | |
| JP | 2007012109 A | * | 1/2007 | |
| JP | 2011248973 A | * | 12/2011 | |
| JP | 2012009122 A | * | 1/2012 | |
| JP | 2012248237 A | * | 12/2012 | |

* cited by examiner

*Primary Examiner* — Will J Klimowicz
(74) *Attorney, Agent, or Firm* — Sony Corporation

(57) ABSTRACT

A cartridge transporting device includes: a cartridge holder in which a cartridge receiving a recording medium is inserted and which holds the inserted cartridge; a supporting frame that supports the cartridge holder to be freely move between an insertion position and a drawn-in position; a locking member that moves between a locking position and a non-locking position, moves to the locking position, and locks the cartridge holder at the insertion position; a holder driving member that is movable in a predetermined direction and moves the cartridge holder between the insertion position and the drawn-in position; and a moving mechanism that moves the holder driving member in the predetermined direction, wherein when the cartridge holder starts to move from the insertion position to the drawn-in position, the holder driving member moves such that the cartridge holder locked by the locking member is unlocked.

13 Claims, 32 Drawing Sheets

CARTRIDGE TRANSPORTING DEVICE

CROSS REFERENCES TO RELATED APPLICATIONS

The present application claims priority to Japanese Priority Patent Application JP 2011-116658 filed in the Japan Patent Office on May 25, 2011, the entire content of which is hereby incorporated by reference.

BACKGROUND

The present disclosure relates to the technical field of cartridge transporting devices. In detail, the present disclosure relates to the technical field for reducing load applied to a moving mechanism when load is applied to a cartridge holder from a cartridge while the cartridge is inserted into the cartridge holder by performing locking at the insertion position of the cartridge holder with a lock member.

Cartridge transporting devices transport a cartridge receiving a recording medium where image data or voice data is recorded.

Some of the cartridge transporting devices are equipped with a cartridge holder where a cartridge is inserted and transport a cartridge by moving the cartridge holder with a moving mechanism between the insertion position where the cartridge is inserted and a drawn-in position where the cartridge is drawn into a case (for example, see Japanese Unexamined Patent Application Publication No. 11-39753).

The cartridge transporting device disclosed in Japanese Unexamined Patent Application Publication No. 11-39753 is equipped with a locking lever that can rotate to lock a cartridge holder at an insertion position, such that when a cartridge is inserted into a cartridge holder, the locking lever is rotated by the insertion of the cartridge and unlocks the cartridge holder.

SUMMARY

However, in the cartridge transporting device that handles a cartridge, as described above, load may be applied to the cartridge holder when the cartridge is inserted into the cartridge holder at the insertion position. For example, when a cartridge is inserted by a large force from a user or an inserting mechanism, excessive load is applied to the cartridge holder, such that load is applied to a moving mechanism that moves the cartridge holder, through the cartridge holder.

When load is applied to the moving mechanism, the moving mechanism may be damaged or broken, such that malfunction may be generated when moving the cartridge holder. For example, the moving mechanism is composed of a motor and gears, the teeth of the gears may be broken off or chipped or malfunction of the motor may be generated by load applied to the motor.

However, in the cartridge transporting device disclosed in Japanese Unexamined Patent Application Publication No. 11-39753, when the cartridge is inserted into the cartridge holder at the insertion position, the locking lever is rotated by the insertion of the cartridge and unlocks the cartridge holder.

Therefore, when a cartridge is inserted into the cartridge holder by a large force, excessive load is applied to the moving mechanism through the cartridge holder, such that the moving mechanism may be damaged or broken.

Therefore, it is desirable to reduce load that is applied to a moving mechanism when load is applied to a cartridge holder from a cartridge while the cartridge is inserted into the cartridge holder.

According to an embodiment of the present disclosure, there is provided a cartridge transporting device including: a cartridge holder in which a cartridge receiving a recording medium is inserted and which holds the inserted cartridge; a supporting frame that supports the cartridge holder to be freely move between an insertion position where the cartridge is inserted and a drawn-in position where the cartridge is drawn-in from the insertion position; a locking member that moves between a locking position where the cartridge holder is locked and a non-locking position where the cartridge holder is unlocked, moves to the locking position, and locks the cartridge holder at the insertion position; a holder driving member that is movable in a predetermined direction and moves the cartridge holder between the insertion position and the drawn-in position; and a moving mechanism that moves the holder driving member in the predetermined direction, in which when the cartridge holder starts to move from the insertion position to the drawn-in position, the holder driving member moves such that the cartridge holder locked by the locking member is unlocked.

Therefore, in the cartridge transporting device, the cartridge holder is locked by the locking member, and when the cartridge holder starts to move from the insertion position to the drawn-in position, the cartridge holder is unlocked.

In the cartridge transporting device, it is preferable that the holder driving member has a locking operation portion, and the locking member is moved from the non-locking position to the locking position by the operation of the locking operation portion of the holder driving member, when the cartridge holder moves from the drawn-in position to the insertion position.

Since the locking member is moved from the non-locking position to the locking position by the operation of the locking operation portion of the holder driving member when the cartridge holder is moved from the drawn-in position to the insertion position, the cartridge holder is moved by the holder driving member and the cartridge holder is locked by the locking member.

In the cartridge transporting device, it is preferable that the locking member has a locking portion and the cartridge holder has a locked portion, and the locking member moves perpendicular to the insertion direction of the cartridge in the cartridge holder such that the locking portion is engaged with the locked portion to lock the cartridge holder.

Since as the locking member is moved perpendicular to the insertion direction of the cartridge in the cartridge holder, the locking portion is engaged with the locked portion and the cartridge holder is locked, the direction in which a force is applied to the cartridge holder from the cartridge is perpendicular to the movement direction of the locking member.

In the cartridge transporting device, it is preferable that the locking portion of the locking member is formed in a plate shape, and the locked portion of the cartridge holder is formed as an locked hole, the locking portion is inserted and fitted in the locked hole, thereby the cartridge holder is locked, and the width direction of the locking portion is the same as the insertion direction of the cartridge in the cartridge holder.

Since the locking portion is inserted and fitted in the locked hole and the cartridge holder is locked and the width direction of the locking portion is the same as the insertion direction of the cartridge in the cartridge holder, the locking member is not easily deformed in the insertion direction of the cartridge in the cartridge holder.

In the cartridge transporting device, it is preferable that the locking portion of the locking member is elastically deformable, the locked portion of the cartridge holder is formed as a locked hole, and the locking portion is elastically restored from elastic deformation, thereby the locking portion is inserted and engaged with the locked hole.

Since the locking portion elastically restores from the elastic deformation and is inserted into the locked hole and engaged therewith, the locking portion that has elastically restored engages with into the locked hole.

In the cartridge transporting device, it is preferable that two locking members are provided and moved away from and closer to each other such that the cartridge holder is locked and unlocked.

Two locking members are provided, and as the locking members lock and unlock the cartridge holder while moving away from and closer to each other, the cartridge holder is locked at two positions by the locking member.

In the cartridge transporting device, it is preferable that two locking members are provided and moved away from and closer to each other, and the locking portions of the two locking members are disposed at the ends in the directions in which the two locking members are spaced apart from each other.

Since locking portions of two locking members are disposed at the ends in the direction in which the locking members are spaced apart from each other, the distance of the two positions where the cartridge holder is locked is larger in the direction perpendicular to the insertion direction of the cartridge in the cartridge holder.

In cartridge transporting device, it is preferable that the holder driving member has a locking operation portion and a biasing spring that biases the locking members to come closer to each other, the locking members are moved from the non-locking position to the locking position by the operation of the locking operation portion, and when the operation of the locking operation portion to the locking member is removed, the locking members are moved from the locking position to the non-locking position by the biasing force of the biasing spring.

Since the locking members are moved to the non-locking position from the locking position by the biasing force of the biasing spring when the operation of the locking operation portion to the locking members is removed, it is not necessary to provide a mechanism for moving the locking members from the locking position to the non-locking position.

In the cartridge transporting device, it is preferable that as the holder driving member moves in one direction, the cartridge holder is pressed by the holder driving member and moved from the drawn-in position to the insertion position to the drawn-in position, as the holder driving member moves in the other direction, the cartridge holder is pressed by the holder driving member and moved from the insertion position to the drawn-in position, as the holder driving member moves in one direction, the locking operation portion slides and comes in contact with the locking members and the locking members move from the non-locking position to the locking position, and as the holder driving member moves in the other direction, the locking operation portion spaces apart from the locking members and the locking members move from the locking position to the non-locking position.

As the holder driving member moves, the cartridge holder moves and the locking members move while the holder driving member moves, such that the cartridge holder and the locking members are moved by the holder driving member.

In the cartridge transporting device, it is preferable that the holder driving member has a locking operation portion and an unlocking portion, the locking members are moved from the non-locking position to the locking position by the operation of the locking operation portion, and when the operation of the locking operation portion to the locking members is removed, the locking members are moved from the locking position to the non-locking position by the operation of the unlocking position.

Since the locking members are moved to the non-locking position from the locking position by the operation of the unlocking portion when the operation of the locking operation portion to the locking members is removed, the holder driving member is moved and the locking members are moved from the locking position to the non-locking position.

In the cartridge transporting device, it is preferable that as the holder driving member moves in one direction, the cartridge holder is pressed by the holder driving member and moved from the drawn-in position to the insertion position, as the holder driving member moves in the other direction, the cartridge holder is pressed by the holder driving member and moved from the insertion position to the drawn-in position, as the holder driving member moves in one direction, the locking operation portion slides and comes in contact with the locking members and the locking members move from the non-locking position to the locking position, and as the holder driving member moves in the other direction, the locking operation portion spaces apart from the locking members, the unlocking portion slides and comes in contact with the locking members, and the locking members move from the locking position to the non-locking position.

As the holder driving member moves, the cartridge holder moves and the unlocking portion slides and comes in contact with the locking members such that the locking members are moved from the locking position to the non-locking position while the holder driving member moves, the cartridge holder is moved and locking by the locking member is removed by the holder driving member.

A cartridge transporting device according to an embodiment of the present disclosure includes: a cartridge holder into which a cartridge receiving a recording medium is inserted and which holds the inserted cartridge; a supporting frame that supports the cartridge holder to be freely move between an insertion position where the cartridge is inserted and a drawn-in position where the cartridge is drawn-in from the insertion position; a locking member that moves between a locking position where the cartridge holder is locked and a non-locking position where the cartridge holder is unlocked, moves to the locking position and locks the cartridge holder at the insertion position; a holder driving member that is movable in a predetermined direction and moves the cartridge holder between the insertion position and the drawn-in position; and a moving mechanism that moves the holder driving member in the predetermined direction, in which when the cartridge holder starts to move from the insertion position to the drawn-in position, the holder driving member moves such that the cartridge holder locked by the locking member is unlocked.

Therefore, even if the cartridge is inserted into the cartridge holder by a large force at the insertion position, it is possible to reduce load to the moving mechanism while preventing a large load from being applied to the moving mechanism through the cartridge holder.

In the cartridge transporting device according to an embodiment of the present disclosure, the holder driving member has a locking operation portion such that the locking member is moved from the non-locking position to the locking position by the operation of the locking operation portion of the holder driving member, when the cartridge holder moves from the drawn-in position to the insertion position.

Therefore, since the cartridge holder is moved by the holder driving member and locked by the locking members, it is possible to lock the cartridge holder at the insertion position while reducing the number of components and simplifying the mechanism in the cartridge transporting device.

In the cartridge transporting device according to an embodiment of the present disclosure, the locking member has a locking portion and the cartridge holder has a locked portion, such that the locking member moves perpendicular to the insertion direction of the cartridge in the cartridge holder such that the locking portion is engaged with the locked portion to lock the cartridge holder.

Therefore, it is possible to keep the cartridge holder stably locked and reliably controlling movement of the cartridge holder.

In the cartridge transporting device according to an embodiment of the present disclosure, the locking portion of the locking member is formed in a plate shape and the locked portion of the cartridge is formed as a locked hole such that the locking portion is inserted and fitted in the locked hole, the cartridge holder is locked, and the width direction of the locking portion is the same as the insertion direction of the cartridge in the cartridge holder.

Therefore, the locking members are not easily deformed in the insertion direction of the cartridge holder in the cartridge and it is possible to keep the cartridge holder stably locked and reliably controlling movement of the cartridge holder.

In the cartridge transporting device according to an embodiment of the present disclosure, the locking portion of the locking member is elastically deformable and the locked portion of the cartridge holder is formed as a locked hole, such that as the locking portion is elastically restored from elastic deformation, the locking portion is inserted and engaged with the locked hole.

Therefore, since the locking portions of the locking members elastically are restored and are inserted and fitted in the locked holes, it is possible to reliably lock the cartridge holder at the insertion position.

In cartridge transporting device according to an embodiment of the present disclosure, two locking members are provided and moved away from and closer to each other such that the cartridge holder is locked and unlocked.

Therefore, since the cartridge holder is locked by two locking members that move in the insertion direction of the cartridge holder in the cartridge, it is possible to keep the cartridge holder more stably locked at the insertion position.

In cartridge transporting device according to an embodiment of the present disclosure, two locking members are provided and moved away from and closer to each other, and the locking portions of the two locking members are disposed at the ends in the directions in which the two locking members are moved away from each other.

Therefore, since the distance between two positions that lock the cartridge holder is large in the direction perpendicular to the insertion direction of the cartridge in the cartridge holder, it is possible to keep the cartridge holder stably locked and more reliably controlling movement of the cartridge holder.

In cartridge transporting device according to an embodiment of the present disclosure, the holder driving member has a locking operation portion and the a biasing spring that biases the locking members to come closer to each other, such that the locking members are moved from the non-locking position to the locking position by the operation of the locking operation portion and the operation of the locking operation portion to the locking member is removed, the locking members are moved from the locking position to the non-locking position by the biasing force of the biasing spring.

Therefore, since the locking members are moved to the non-locking position by a simple configuration, it is possible to unlock the cartridge holder while simplifying the mechanism in the cartridge transporting device.

In the cartridge transporting device according to an embodiment of the present disclosure, as the holder driving member moves in one direction, the cartridge holder is pressed by the holder driving member and moved from the drawn-in position to the insertion position, as the holder driving member moves in the other direction, the cartridge holder is pressed by the holder driving member and moved from the insertion position, as the holder driving member moves in one direction to the drawn-in position, the locking operation portion slides and comes in contact with the locking members and the locking members move from the non-locking position to the locking position, and as the holder driving member moves in the other direction, the locking operation portion moves away from the locking members and the locking members move from the locking position to the non-locking position.

Therefore, since the cartridge holder and the locking members are moved by the holder driving member, it is not necessary to provide exclusive mechanisms for moving the cartridge holder and the locking members, such that it is possible to lock and unlock the cartridge holder while reducing the number of components and simplifying the mechanism in the cartridge transporting device.

In the cartridge transporting device according to an embodiment of the present disclosure, the holder driving member has a locking operation portion and an unlocking portion, such that the locking members are moved from the non-locking position to the locking position by the operation of the locking operation portion and the operation of the locking operation portion to the locking members is removed, the locking members are moved from the locking position to the non-locking position by the operation of the unlocking position.

Therefore, since the locking members are moved to the non-locking position by the operation of the unlocking portion and the cartridge holder is unlocked, it is possible to reliably unlock the cartridge holder while simplifying the mechanism in the cartridge transporting device.

In the cartridge transporting device according to an embodiment of the present disclosure, as the holder driving member moves in one direction, the cartridge holder is pressed by the holder driving member and moved from the drawn-in position to the insertion position, as the holder driving member moves in the other direction, the cartridge holder is pressed by the holder driving member and moved from the insertion position to the drawn-in position, as the holder driving member moves in one direction, the locking operation portion slides and comes in contact with the locking members and the locking members move from the non-locking position to the locking position, and as the holder driving member moves in the other direction, the locking operation portion moves away from the locking members, the unlocking portion slides and comes in contact with the locking members, and the locking members move from the locking position to the non-locking position.

Therefore, since the cartridge holder and the locking members are moved by the holder driving member, it is not necessary to provide exclusive mechanisms for moving the cartridge holder and the locking members, such that it is possible to reliably unlock the cartridge holder while reducing the number of components and simplifying the mechanism.

Additional features and advantages are described herein, and will be apparent from the following Detailed Description and the figures.

DETAILED DESCRIPTION

Figure 1:
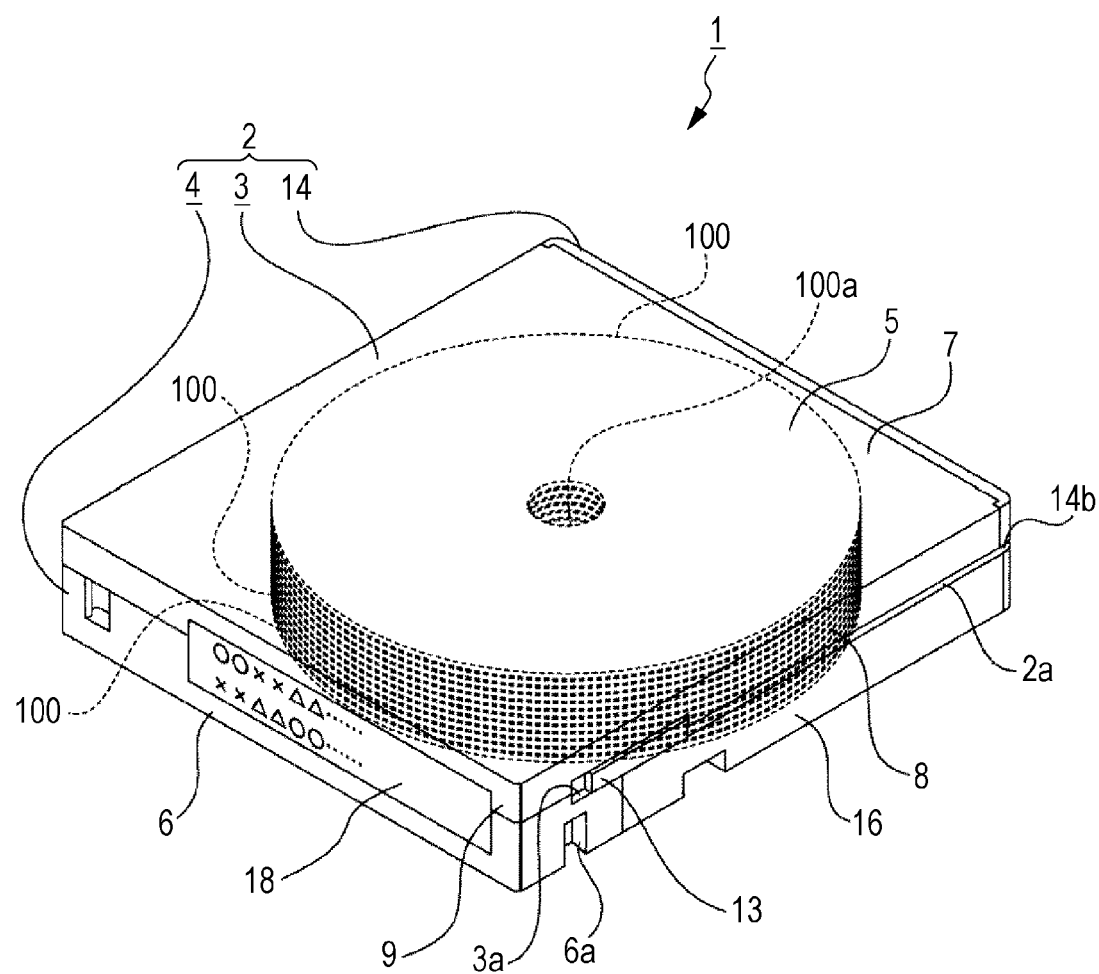
FIG. 1 is a view showing an embodiment of a cartridge transporting device of the present disclosure together with FIGS. 2 to 32, in which a perspective view of a disk cartridge where a disk type recording medium carried by the cartridge transporting device is received is shown.

Embodiments of a cartridge transporting device according to an embodiment of the present disclosure are described hereafter with reference to the accompanying drawings. A cartridge transporting device has a function of transporting a cartridge, where a recording medium is received, in a cartridge holder.

In the following description, the front-rear, up-down, and left-right directions are determined under the assumption that a cartridge is moved from rear to the front when being inserted from a cartridge holder of the cartridge transporting device.

Further, the front-rear, up-down, and left-right directions are defined for convenience of description and the directions are not limited in embodiments of the present disclosure.

Further, although an example using a disk cartridge that can receive a disk type of recording medium is described below as a cartridge, the cartridge is not limited to a disk cartridge in the present disclosure and various shapes of cartridges may be used as long as they can receive a recording medium. For example, it is possible to use cartridges that can receive various recording medium, such as a tape type of recording medium or a card type of recording medium as a cartridge.

Configuration of Disk Cartridge

At first, the configuration of a disk cartridge that is inserted in a cartridge transporting device is described (see FIGS. 1 to 4).

A disk cartridge 1 is achieved by disposing necessary components in a case 2 and the case 2 includes a first shell 3 and a second shell 4. A plurality of disk type recording medium 100, 100, . . . can be received with regular intervals in the up-down direction, in the case 2.

Figure 2:
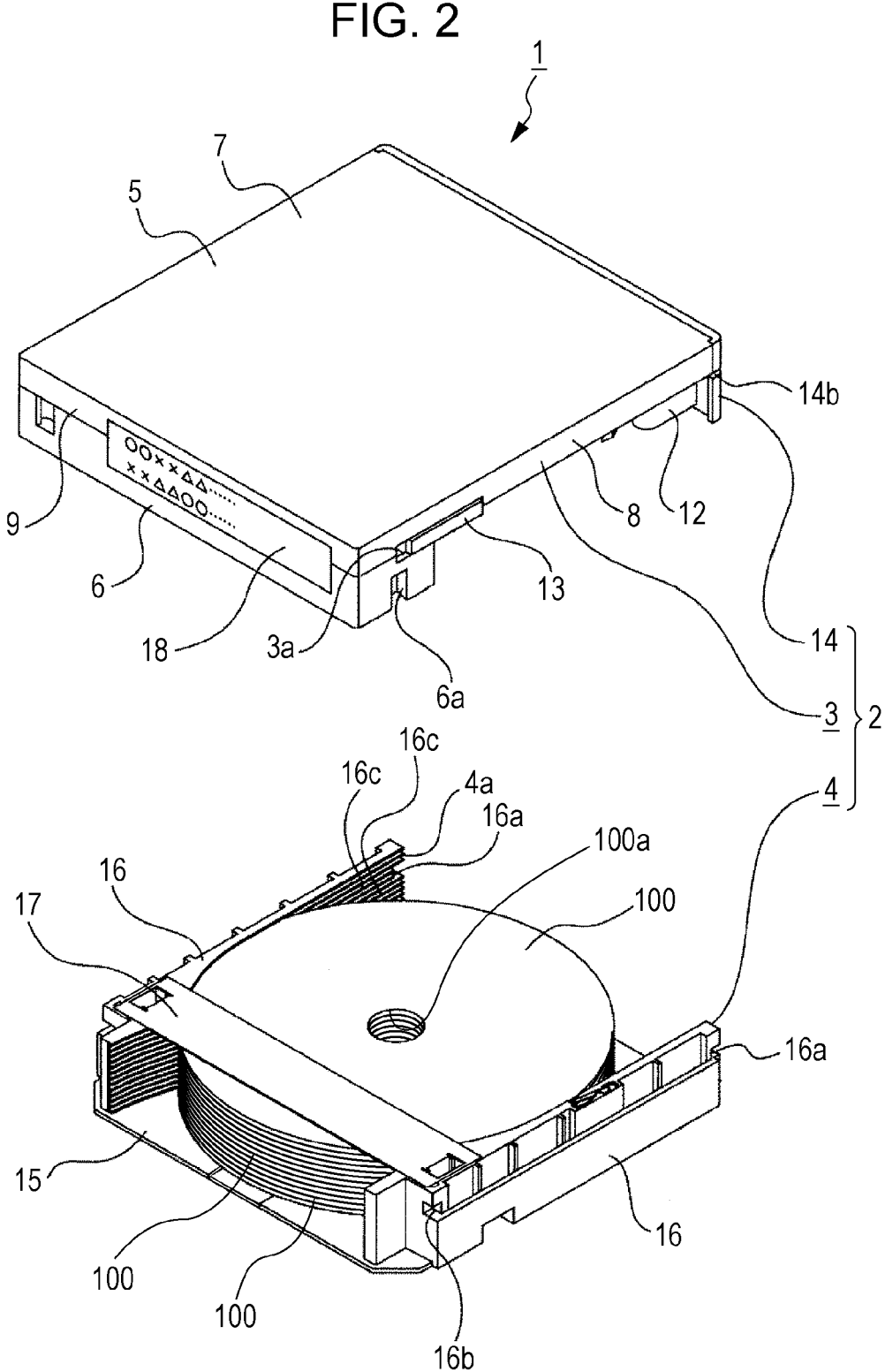
FIG. 2 is a perspective view of the disk cartridge with a first shell and a second shell separated.
Figure 3:
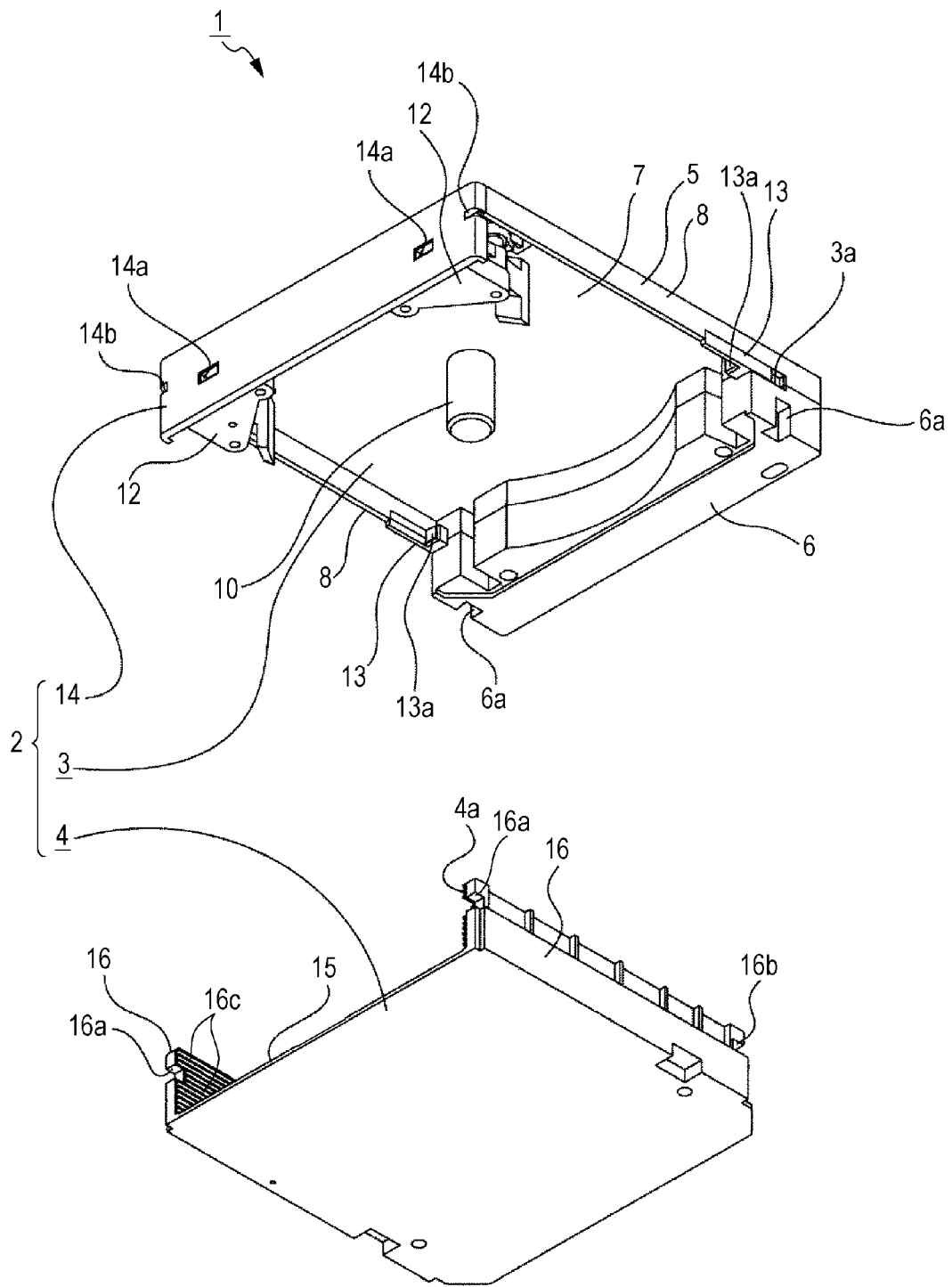
FIG. 3 is a perspective view of the disk cartridge with the first shell and the second shell separated, seen in a different direction from FIG. 2.

The first shell 3 and the second shell 4 can be combined or separated, for example, in the up-down direction (see FIGS. 1 to 3). When the case 2 is vertically long, the first shell 3 and the second shell 4 are combined or separated in the left-right direction.

The first shell 3 is achieved by combining a base 5 with a sub-base 6 attached to the rear end of the base 5 in the up-down direction.

The base 5 has a base surface 7 disposed in the up-down direction, side surfaces 8, 8 protruding downward from both left and right ends of the base surface 7, and a rear surface 9 protruding downward from the rear end of the base surface 7.

A center pin 10 having a round shank shaft protrudes downward from the center portion of the base surface 7.

Figure 4:
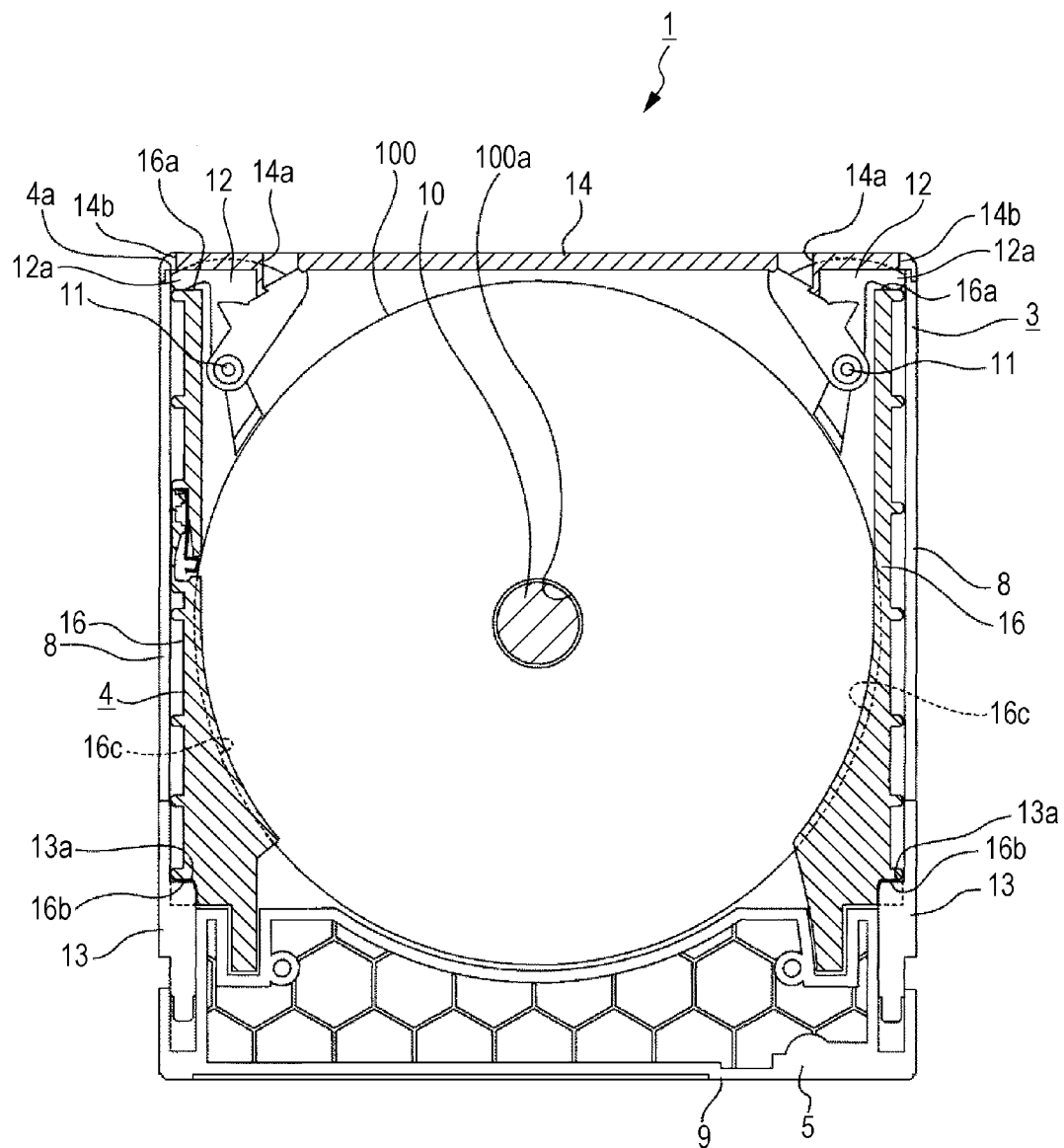
FIG. 4 is a cross-sectional view of the disk cartridge with the first shell and the second shell locked by a locking slider.

Support shafts 11, 11 protruding downward are formed separately at the left and right front corners of the base surface 7 (see FIG. 4).

Rectangular grips 6a, 6a that are open to a side (outward) and downward are formed at the lower ends of both left and right ends of the sub-base 6 (see FIGS. 1 and 4).

Slider supports 3a, 3a are formed close to the rear ends of both left and right sides of the first shell 3.

Locking levers 12, 12 are rotatably supported by the support shafts 11, 11, respectively, of the first shell 3.

A locking protrusion 12a that protrudes to a side is formed at the front end of the locking lever 12 (see FIG. 4). With the locking levers 12, 12 supported by the support shafts 11, 11, the locking levers 12, 12 are biased by locking springs such that the locking protrusions 12a, 12a are closer to the sides 8, 8.

Locking sliders 13, 13 are supported by the slider supports 3a, 3a of the first shell 3, respectively, to be slidable in the front-rear direction (see FIGS. 1 to 4). The locking sliders 13, 13 are biased by coil springs (not shown), respectively. The locking sliders 13, 13 have locking protrusions 13a, 13a, respectively, protrude inward at the middle portions in the front-rear direction, respectively (see FIGS. 3 and 4).

An opening/closing panel 14 is attached to the front end of the first shell 3 (see FIGS. 1 to 4). Insertion holes 14a, 14a are formed left and right at a predetermined distance at the opening/closing panel 14. Cut portions 14b, 14b for insertion that are open to the outside are formed at the left and right ends of the opening/closing panel 14.

The second shell 4 has a base surface 15 disposed in the up-down direction and sides 16, 16 protruding upward from both left and right sides of the base surface 15, in which the base surface 15 and the sides 16 are integrally formed.

First locking grooves 16a that are open to the front and the sides are formed at the front ends of the sides 16 and second locking grooves 16b that are open to the rear and the outside are formed close to the rear ends.

Holding grooves 16c, 16c, . . . are formed with regular intervals in the up-down direction, on the inner surface of the side 16.

A bridge member 17 is mounted, close to the rear ends, on the sides 16, 16 of the second shell 4 (see FIG. 2).

The disk cartridge 1 is provided with an information input sheet 18, for example, on the rear surface of the case 2, as an information input unit (see FIGS. 1 and 2). Predetermined information, for example, the information of the pitch of the disk type recording medium 100, 100, . . . received in the case 2 and the number of the received disk type recording medium 100, 100 is input to the information input sheet 18.

The information input unit is not limited to the information input sheet 18, and for example, an appropriate means, such as a barcode printed on the case 2 or a recording chip embedded in the case 2, may be used.

In the disk cartridge 1 having the configuration described above, the disk type recording medium 100, 100, . . . are held in the case 2 (see FIGS. 1 and 2). The disk type recording medium 100 is held in the case 2 by inserting the outer circumference into the holding grooves 16c, 16c formed on the sides 16, 16 of the second shell 4 from the front side, with the first shell 3 and the second shell 4 separated. Therefore, the openings at the front end of the second shell 4 are formed as disk inserting/taking-out holes 4a for inserting and taking out the disk type recording medium 100, 100, . . . into and from the second shell 4.

With the case 2 assembled by combining the first shell 3 with the second shell 4 and attaching the opening/closing panel 14 to the first shell 3, insertion grooves 2a, 2a extending to the front and rear are formed at both left and right sides (see FIG. 1). The insertion grooves 2a, 2a have the rear ends connected with the slider supports 3a, 3a of the first shell 3 and the front ends connected with the cut portions 14b, 14b for insertion formed at the opening/closing panel 14.

Combination State of Disk Cartridge

The combination state of the disk cartridge 1 is described hereafter (see FIG. 4).

The first shell 3 and the second shell 4 are combined, with the base surface 7 of the base 5 and the base surface 15 opposite up and down each other.

With the first shell 3 and the second shell 4 combined, the first shell 3 and the second shell 4 are locked by the locking levers 12, 12 and the locking sliders 13, 13.

The locking levers 12, 12 are positioned at rotational ends in the direction (outward) in which the locking protrusions 12a, 12a are moved away from each other by the biasing force of the locking springs while the locking protrusions 12a, 12a are inserted and engaged in the first locking grooves 16a, 16a formed at the sides 16, 16 of the second shell 4.

The locking sliders 13, 13 are positioned at moving ends at the front by the biasing force of the coil springs while the locking protrusions 13a, 13a are inserted and engaged in the second locking grooves 16b, 16b formed at the sides 16, 16 of the second shell 4.

With the first shell 3 and the second shell 4 combined, the center pin 10 formed at the first shell 3 is inserted in the center holes 100a, 100a, . . . of the disk type recording medium 100, 100, . . . .

Configuration of Cartridge Transporting Device

The configuration of a cartridge transporting device is described hereafter (see FIGS. 5 to 13).

Figure 5:
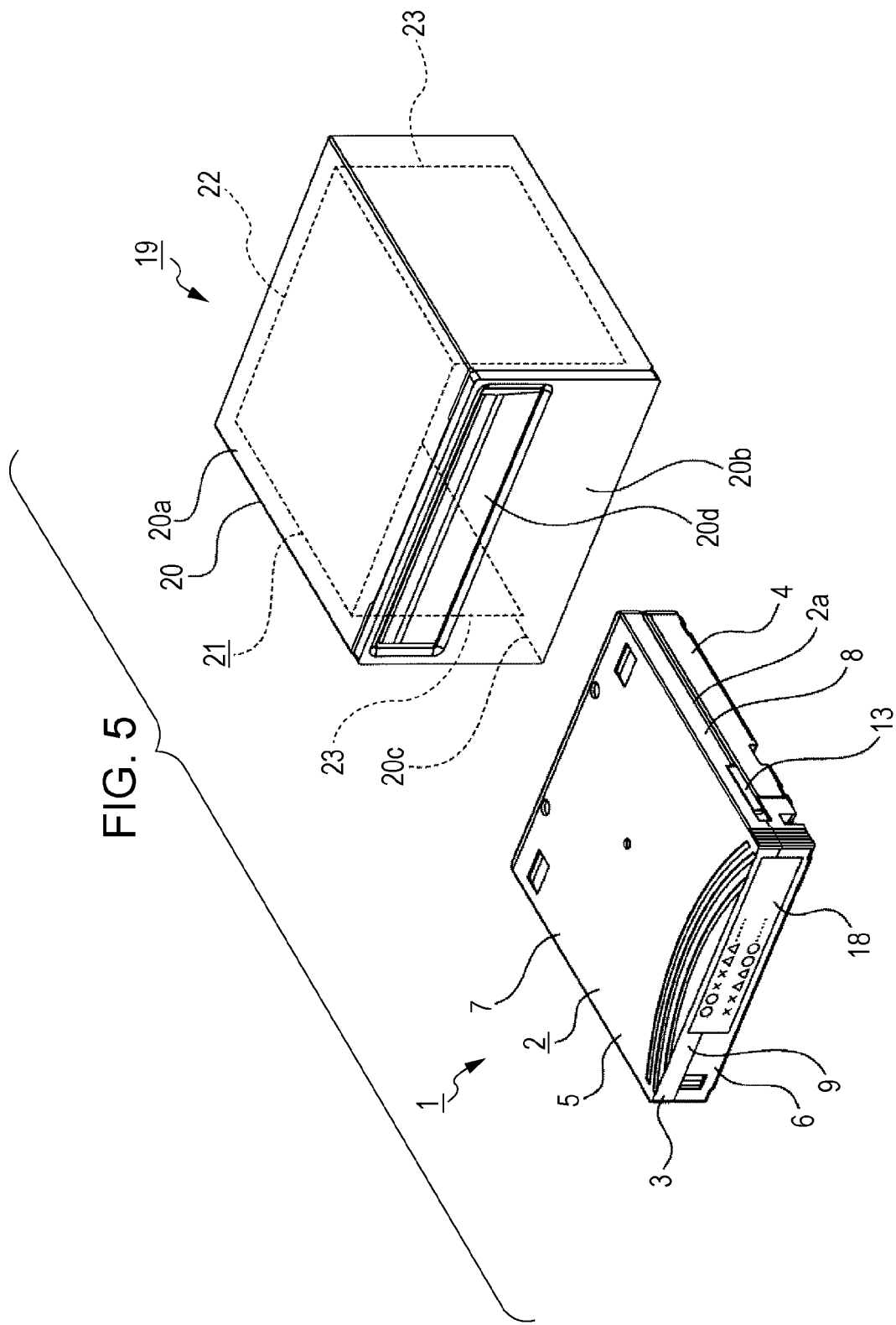
FIG. 5 is a perspective view showing the cartridge transporting device with the disk cartridge.

A cartridge transporting device 19 is achieved by disposing necessary components in an outer case 20 (see FIG. 5).

The outer case 20 is composed of an outer case 20a that is open forward and downward, a panel 20b attached to the rear end of the outer frame 20a and disposed in the front-rear direction, and a base frame 20c attached to the lower end of the outer frame 20a and disposed in the up-down direction.

A cartridge inserting/taking-out hole is formed in the front-rear direction through the upper end of the panel 20b and can be opened/closed by a shutter 20d.

A supporting frame 21 is disposed in the outer case 20. The supporting frame 21 has a top plate 22 and side plates 23, 23 protruding downward from the left and right sides of top plate 22 (see FIGS. 6 to 8).

Figure 9:
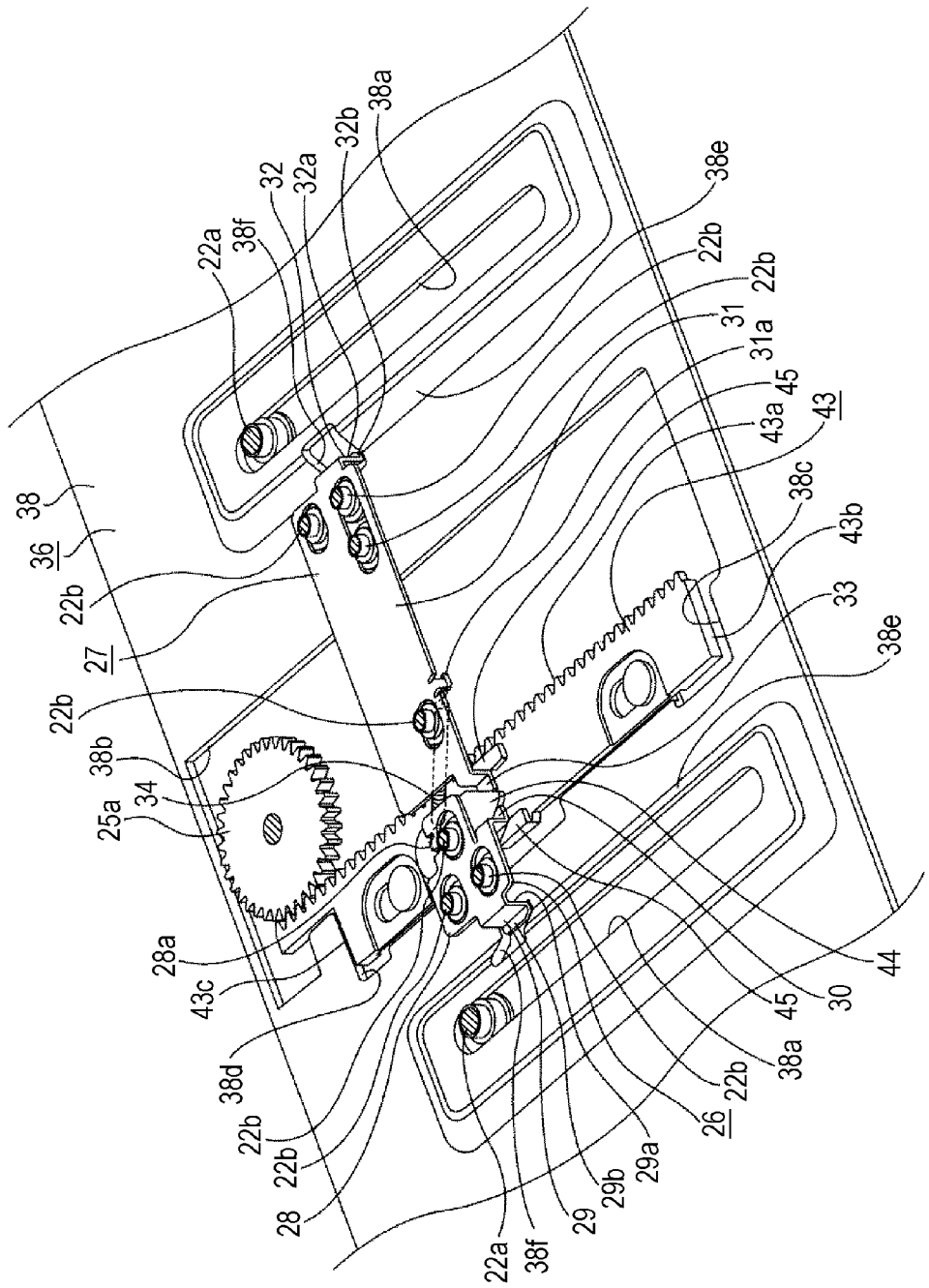
FIG. 9 is an enlarged perspective view showing a cartridge holder, a holder driving member, and a locking member.

Support pins 22a, 22a protruding downward are formed at a predetermined distance at the left and right on the top plate 22 (see FIG. 9). Support shaft portions 22b, 22b protruding downward are formed between the support pins 22a, 22a on the top plate 22.

Figure 10:
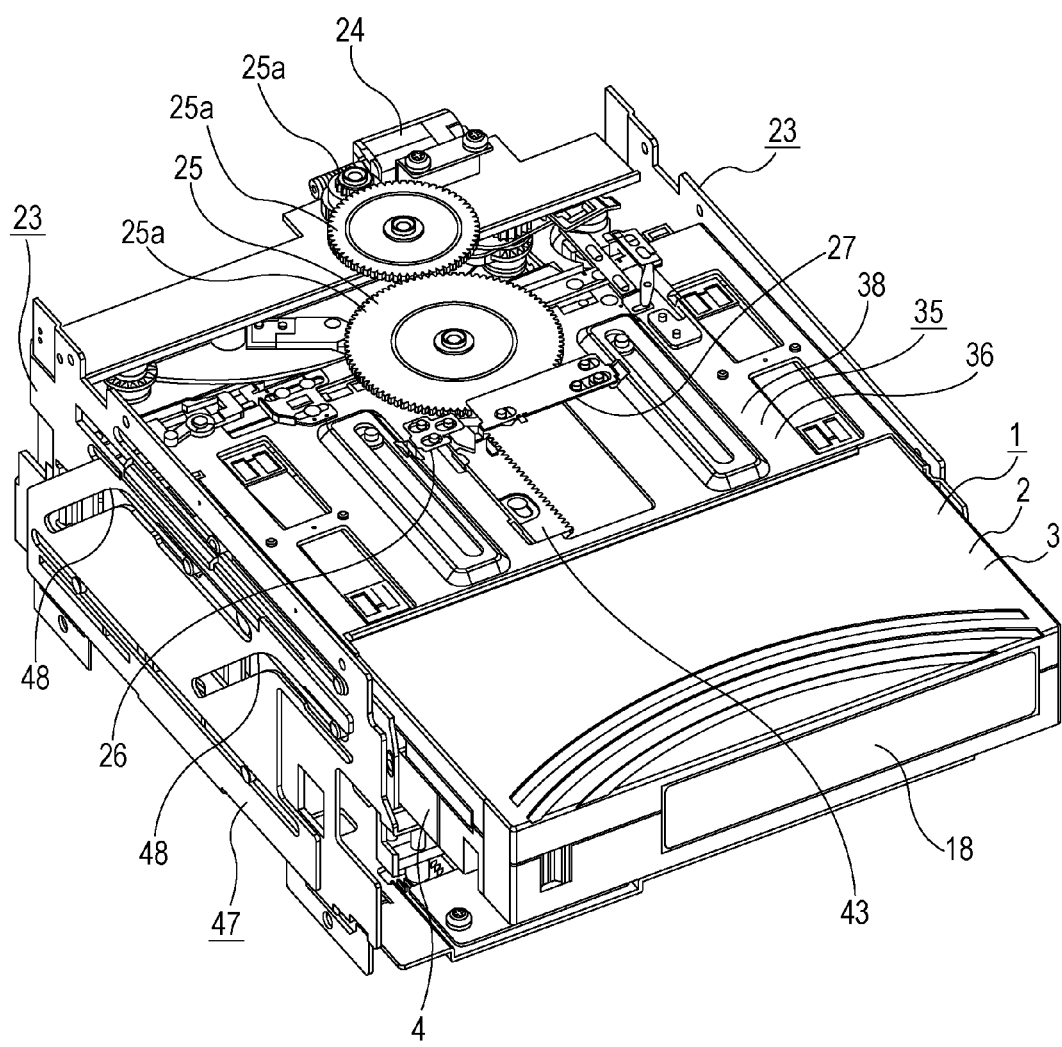
FIG. 10 is a perspective view when the disk cartridge is inserted in the cartridge holder, without showing the supporting frame from the internal structure of the cartridge transporting device.

A moving motor 24 is disposed on the underside of the front end of the top plate 22 (see FIG. 10).

Figure 8:
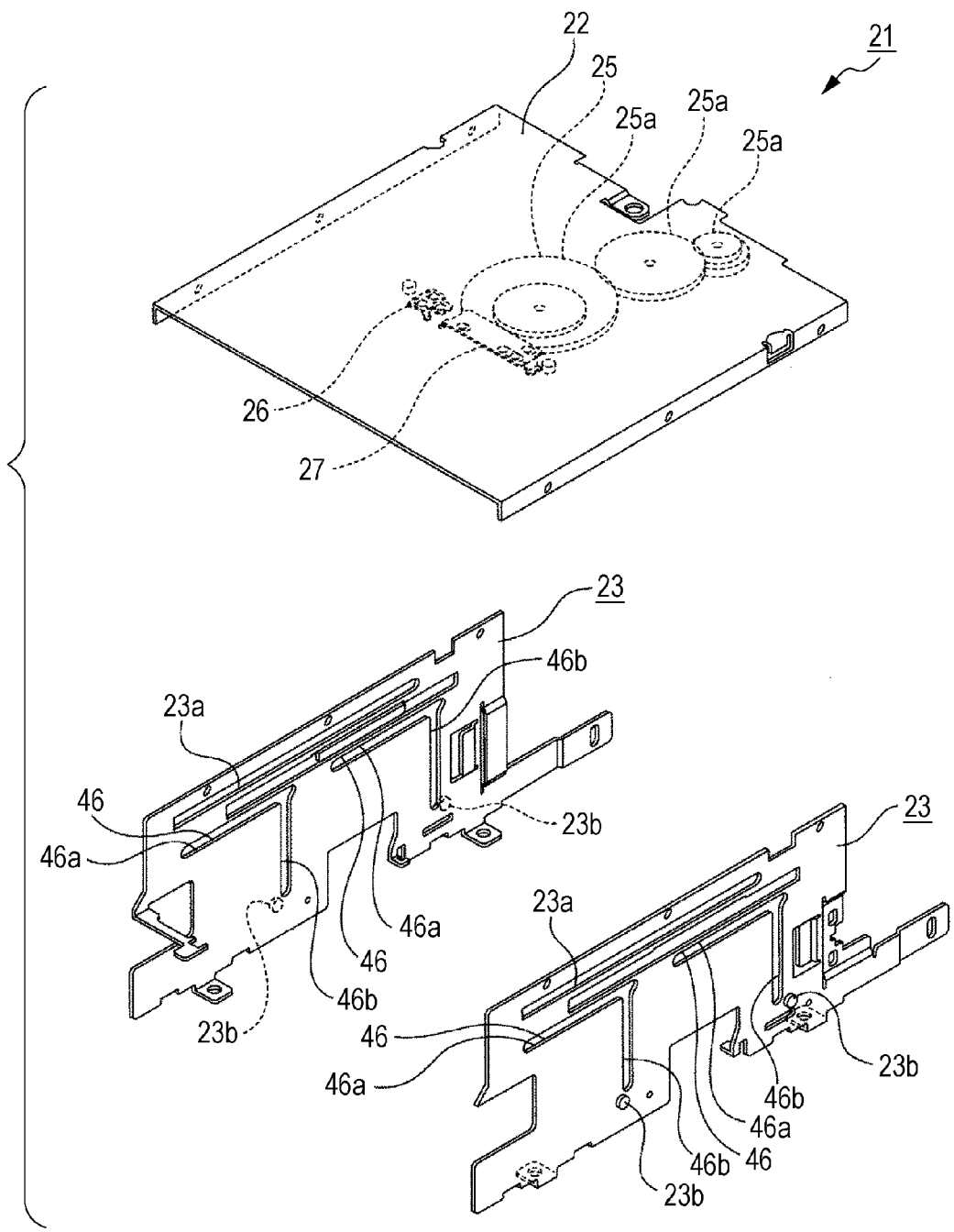
FIG. 8 is an exploded perspective view showing a supporting frame.
Figure 11:
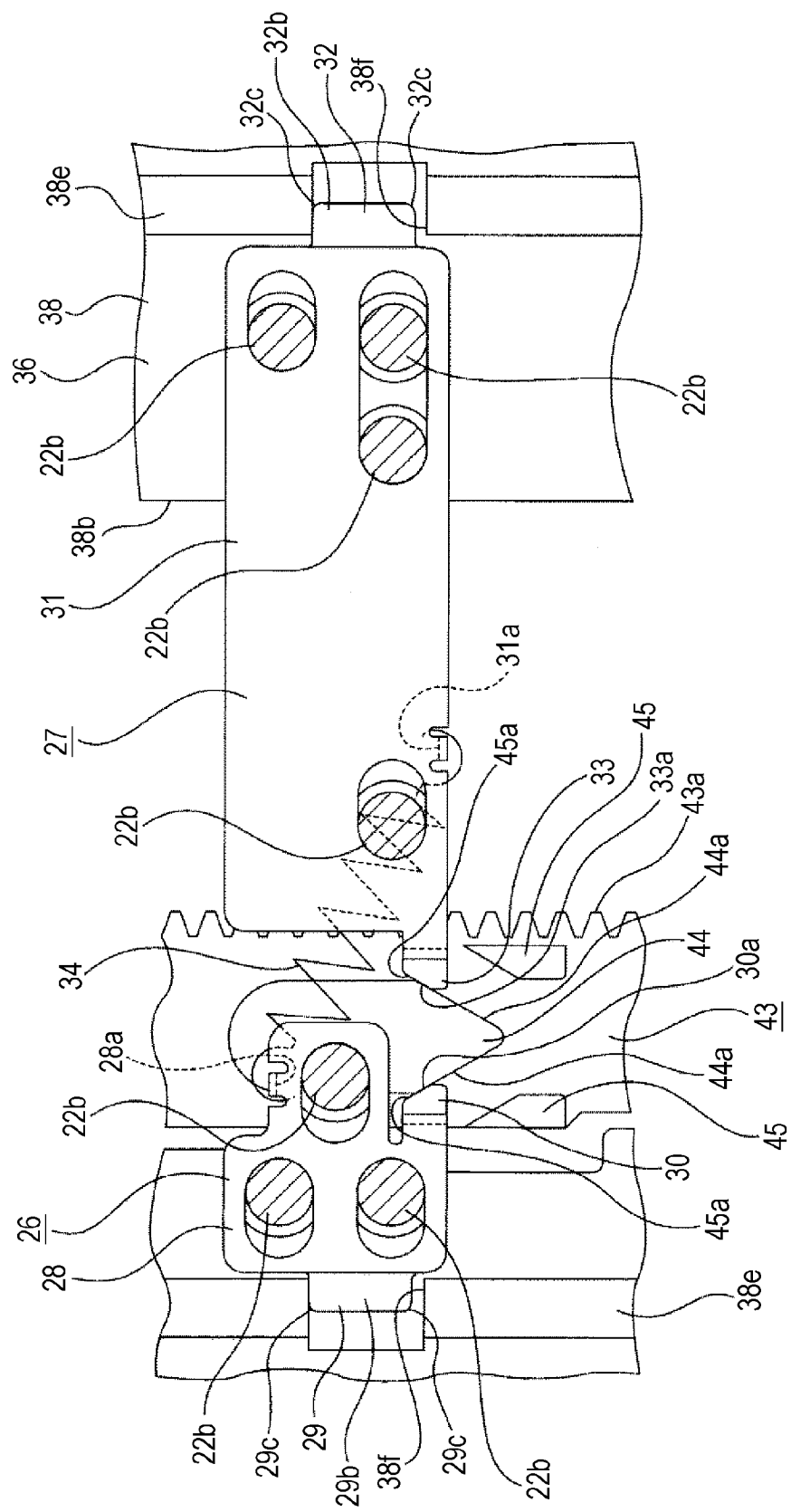
FIG. 11 is an enlarged plan view showing a portion of the holder driving member and the locking member.

A moving gear set 25 is supported on the underside of the top plate 22 (see FIGS. 8, 9, and 11). The moving gear set 25 is rotated by a driving force from the moving motor 24 and composed of gears 25a, 25a, 25a.

A first locking member 26 and a second locking member 27 are arranged to the left and right and supported movably in the left and right direction by the support shaft portions 22b, 22b, . . . , on the underside of the top plate 22. The first locking member 26 and the second locking member 27 move between a locking position and a non-locking position, respectively. The first locking member 26 and the second locking member 27 are implemented, for example, by a plate-shaped metal material.

The first locking member 26, as shown in FIGS. 9 and 11, has a supported surface 28 disposing in the up-down direction, a locking portion 29 protruding downward from the left end of the supported surface 28, and an operated portion 30 protruding downward from the center portion the left-right direction of the supported surface 28.

A spring-holding portion 28a is formed at the front edge of the supported surface 28.

The locking portion 29 has a connection surface 29a connected to the supported surface 28 in the left and right direction and an insertion protrusion 29b protruding left from the lower end of the connection surface 29a and can elastically deform in the left-right direction about the upper end with respect to the supported surface 28. The front and rear edges at the left edge of the insertion protrusion 29b is formed by curved portions 29c, 29c, respectively, which are formed in curved shapes protruding outward.

An inclining edge 30a that inclines for movement rightwards in accordance with rearward movement is formed at the lower end of the operated portion 30.

The second locking member 27 has a supported surface 31 disposing in the up-down direction, a locking portion 32 protruding downward from the right end of the supported surface 31, and an operated portion 33 protruding downward from the center portion the left-right direction of the supported surface 31.

A spring-holding portion 31a is formed at the rear edge of the supported surface 31.

The locking portion 32 has a connection surface 32a connected to the supported surface 31 in the left and right direction and an insertion protrusion 32b protruding right from the lower end of the connection surface 32a and can elastically deform in the left-right direction about the upper end with respect to the supported surface 31. The front and rear edges at the right edge of the insertion protrusion 32b is formed by curved portions 32c, 32c, respectively, which are formed in curved shapes protruding outward.

An inclining edge 33a that inclines for left movement according to rearward movement is formed at the lower end of the operated portion 33.

The first locking member 26 and the second locking member 27 are biased by a biasing spring 34 to be closer to each other in the left-right direction, that is, toward the non-locking position from the locking position. The biasing spring 34, for example, is a tension coil spring and of which both ends are supported by the spring-holding portion 28a, 31a disposed at the supported surfaces 28, 31, respectively.

Although one biasing spring 34 that biases the first locking member 26 and the second locking member 27 toward the non-locking position is exemplified in the above, it may be possible to provide a first biasing member that biases the first locking member 26 toward the non-locking position from the locking-position and a second biasing member that biases the second locking member 27 toward the non-locking position from the locking position.

However, it is possible to reduce the number of components by disposing the biasing member 34 between the first locking member 26 and the second locking member 27 such that the first locking member 26 and the second locking member 27 are biased toward the non-locking position from the locking position by the biasing spring 34.

A cartridge holder 35 is supported by the support pins 22a, 22a on the underside of the top plate 22 to be movable in the front-rear direction (see FIG. 9). The cartridge holder 35 moves from an insertion position where the disk cartridge 1 is inserted and a drawn-in position where the cartridge holder 1 is drawn into the supporting frame 21, with the inserted disk cartridge 1 held.

Figure 12:
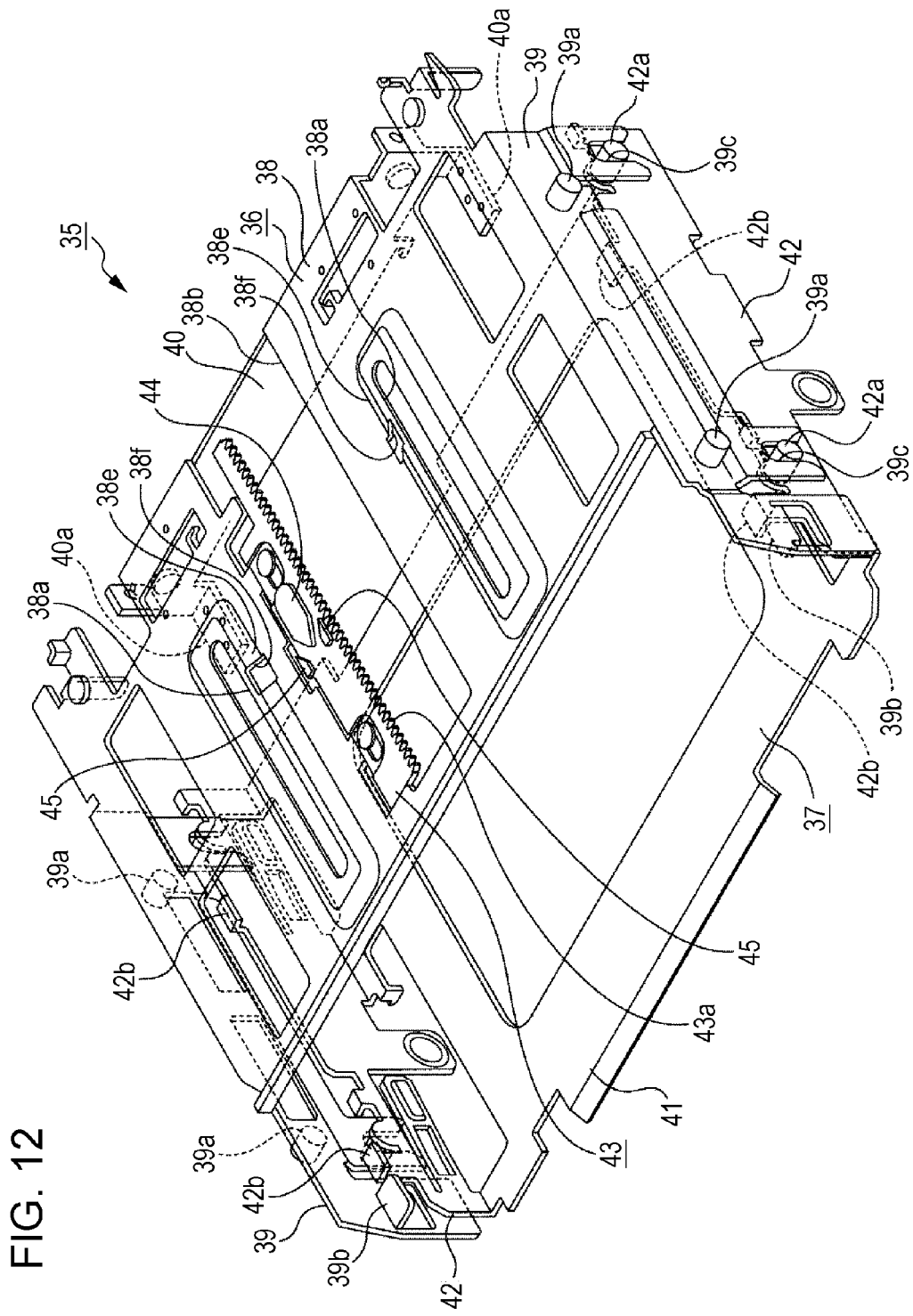
FIG. 12 is a perspective view of the cartridge holder.
Figure 13:
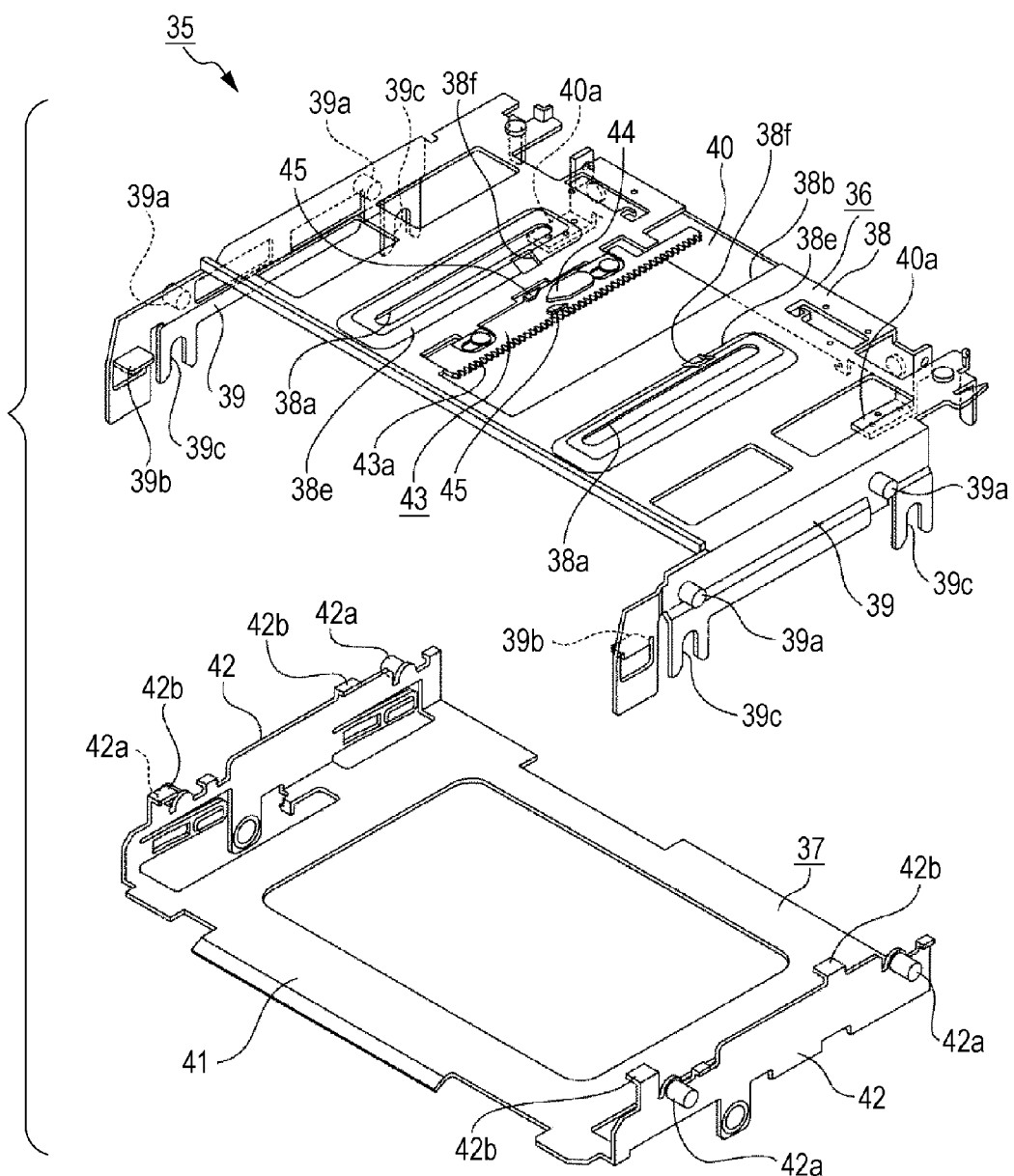
FIG. 13 is a perspective view showing the cartridge holder that is separated.

The cartridge holder 35 is composed of an upper holder 36 and a lower holder 37 (see FIGS. 12 and 13).

The upper holder 36 has a top 38 disposed in the up-down direction, sides 39, 39 protruding downward from the left and right side of the top 38, and a front 40 protruding downward from the front edge of the top 38.

Support holes 38a, 38a extending in the front-rear direction are formed at a predetermined distance at the left and right through the top 38. The cartridge holder 35 is supported on the top plate 22 to be movable in the front-rear direction by the support pins 22a, 22a, through the support holes 38a, 38a.

A longitudinally long arrangement hole 38b is formed between the support holes 38a, 38a through the top 38. A first pressed edge 38c and a second pressed edge 38d are formed at a predetermined distance at the front and rear of the top 38, and the first pressed edge 38c and the second pressed edge 38d are formed by a portion of the open edge of the arrangement hole 38b. The first pressed edge 38c and the second pressed edge 38d are positioned opposite each other in the front-rear direction and the first pressed edge 38c is positioned behind the second pressed portion 38d.

The portions around the support holes 38a, 38a of the top 38 are formed as inclining portions 38e, 38e, which are inclined upward as being closer to the support holes 38a, 38a, respectively.

Locked holes 38f, 38f are formed close to the rear ends of the support holes 38a, 38a, through the top 38, and they are formed at the inclining portions 38e, 38e between the support holes 38a, 38a and the arrangement hole 38b.

Sliding pins 39a, 39a are formed at a predetermined distance at the front and rear portions on the outer surface of the side 39. A releasing portion 39b protruding inward is formed at the rear end of the side 39. Connection grooves 39c, 39c that are open downward are formed at a predetermined distance at the front and rear portions of the rear end of the side 39.

Unlocking portions 40a, 40a are formed at a predetermined distance at the left and right on the front 40. The unlocking portions 40a, 40a protrude rearward.

The upper holder 36 is supported to be movable in the front-rear direction on the supporting frame 21 by inserting the sliding pins 39a, 39a, . . . into the support holes 23a, 23a from the inner surface of the side plates 23, 23.

The lower holder 37 has a lower plate 41 disposed in the up-down direction and sides 42, 42 protruding upward from the left and right edge of the lower plate 41.

Sliding pins 42a, 42a are formed at a predetermined distance at the front and rear portions on the outer surface of the side 42. Holding portions 42b, 42b protruding inward are formed at a predetermined distance at the front and rear portions at the upper end of the side 42.

The upper holder 36 and the lower holder 37 are combined in the up-down direction by inserting and engaging the sliding pins 42a, 42a, . . . into the connection grooves 39c, 39c from below (see FIG. 12).

A holder driving member 43 is supported on the top 38 of the upper holder 36 to be movable in the front-rear direction (see FIGS. 9 to 13) and is arranged in the arrangement hole 38b of the top 38.

The holder driving member 43 is formed in a plate shape in the up-down direction and has a locking portion 43a at the right edge. The rear end of the holder driving member 43 is formed as a first pressing portion 43b and a second pressing portion 43c is formed forward, close to the front end of the holder driving member 43. The first pressing portion 43b and the second pressing portion 43c are positioned opposite each other in the front-rear direction, at the first pressed edge 38c and the second pressed edge 38d, on the top 38 of the cartridge holder 35.

The gap between the first pressing portion 43b and the second pressing portion 43c of the holder driving member 43 are much smaller than the gap between the first pressed edge 38c and the second pressed edge 38d of the cartridge holder 35.

A locking operation portion 44 protruding upward is formed on the upper surface of the holder driving member 43. The locking operation portion 44 has operation edges 44a, 44a at the rear end and the operation edges 44a, 44a incline to be spaced apart in the left-right direction as being close to the front, with the front ends (rear ends) meeting each other.

Unlocking portions 45, 45 protruding upward from the rear of the locking operation portion 44 are formed at a predetermined distance at the left and right on the upper surface of the holder driving member 43. The unlocking portion 45 has releasing edges 45a, 45a at the front end and the releasing edges 45a, 45a incline to be spaced apart in the left-right direction as being close to the front.

The locking portion 43a of the holder driving member 43 is engaged with the rearmost gear 25a in the gear set 25. Therefore, as the driving force of the moving motor 24 is transmitted through the gear set 25, the holder driving member 43 moves in the front-rear direction, such that the moving motor 24 and the gear set 25 function as a moving mechanism that moves the holder driving member 43 in the front-rear direction.

As described above, the gap between the first pressing portion 43b and the second pressing portion 43c of the holder driving member 43 are very smaller than the gap between the first pressed edge 38c and the second pressed edge 38d of the cartridge holder 35. Therefore, the holder driving member 43 can move with respect to the cartridge holder 35, the second pressing portion 43c is positioned behind the second pressed edge 38d, with the holder driving member 43 at the rearmost position from the cartridge holder 35, and the first pressing portion 43b is positioned ahead of the first pressed edge 38c, with the holder driving member 43 at the foremost position from the cartridge holder 35.

The holder driving member 43 can move rearward, with the first pressing portion 43b in contact with the second pressed edge 38c. Therefore, when the holder driving member 43 moves rearward, with the first pressing portion 43b in contact with the first pressed edge 38c, the cartridge holder 35 is pressed to the holder driving member 43, such that the cartridge holder 35 and the holder driving member 43 integrally move rearward.

On the contrary, the holder driving member 43 can move forward even when the second pressing portion 43c is in contact with the second pressed edge 38d. Therefore, when the holder driving member 43 moves forward, with the second pressing portion 43c in contact with the second pressed edge 38d, the cartridge holder 35 is pressed to the holder driving member 43, such that the cartridge holder 35 and the holder driving member 43 integrally move forward.

When the cartridge holder 35 is pressed to the holder driving member 43 and moved in the front-rear direction, the cartridge holder 35 moves with respect to the supporting frame 21.

Figure 7:
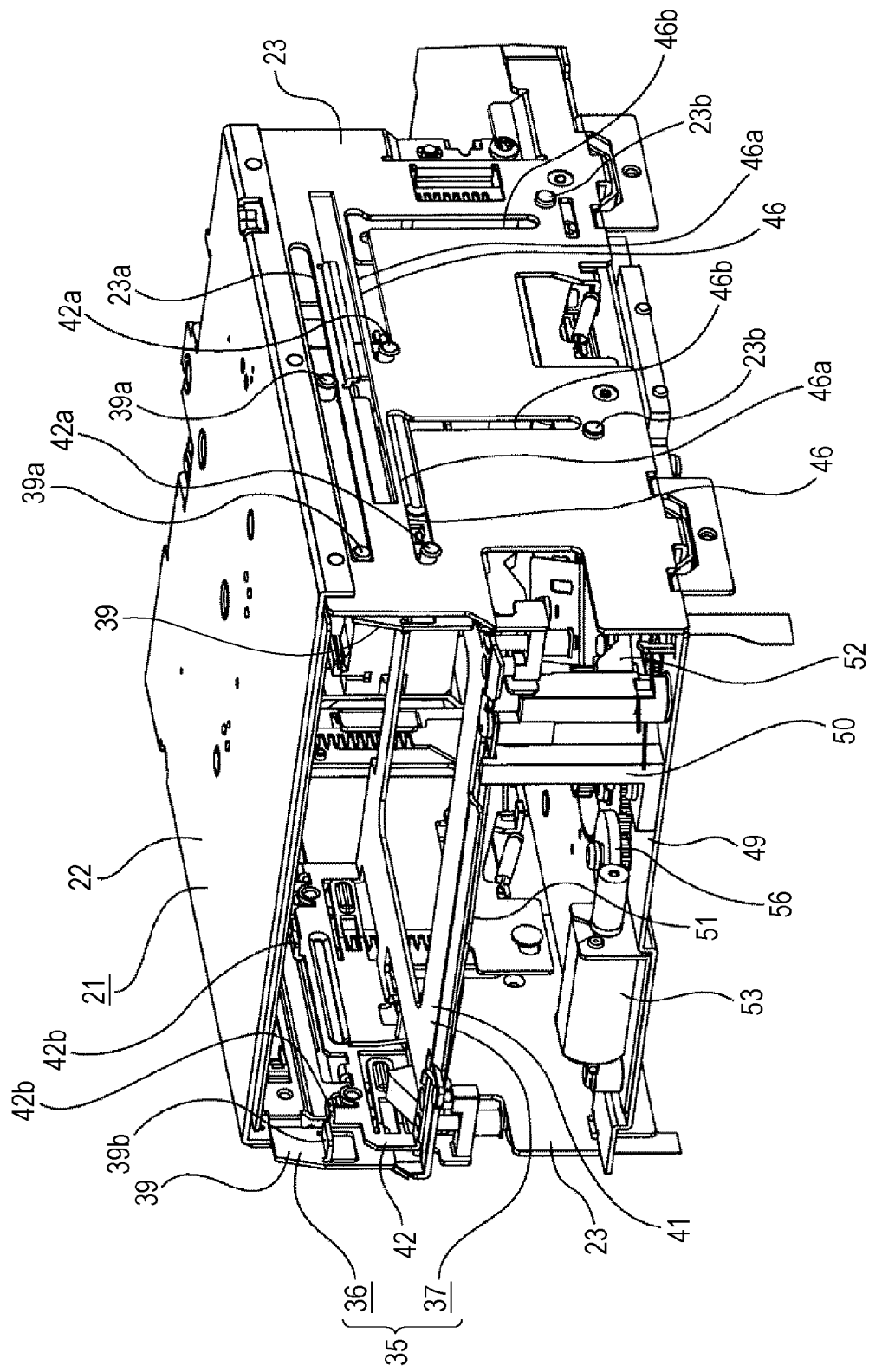
FIG. 7 is a perspective view showing the internal structure of the disk transporting device.

A support hole 23a that extends forward and rearward is formed at the upper end of the side plate 23 of the supporting frame 21 (see FIGS. 7 and 8).

Cam support holes 46, 46 are formed at a predetermined distance at the front and rear, through the side plate 23. The cam support hole 46 has a horizontal portion 46a extending forward and rearward and a vertical portion 46b extending up and down, and the front end of the horizontal portion 46a and the upper end of the vertical portion 46b are connected.

Support hole pins 23b, 23b protruding outward are formed at a predetermined distance at the front and rear, at the lower end of the side plate 23.

Figure 6:
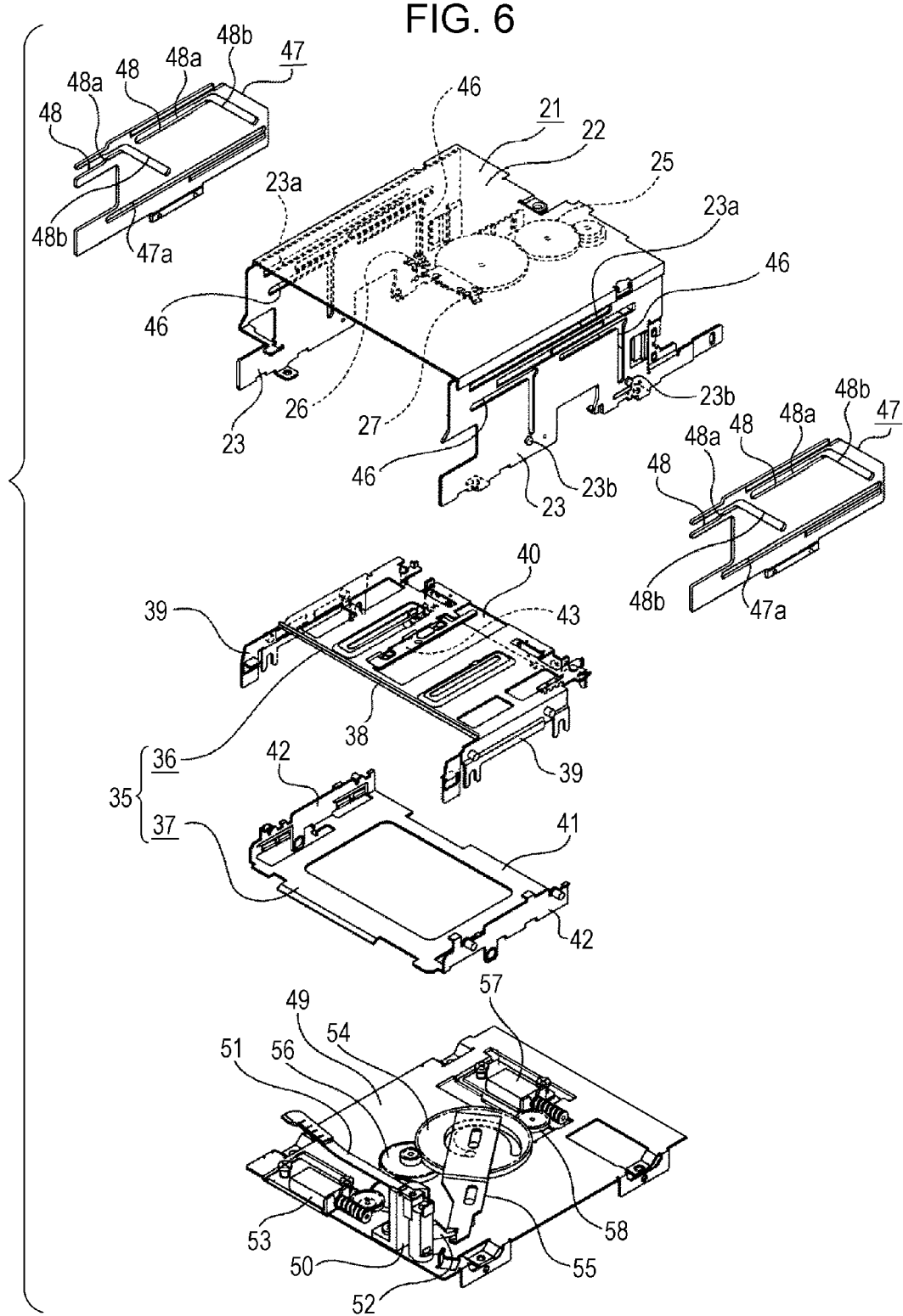
FIG. 6 is an exploded perspective view showing the internal structure of the disk transporting device.

Sliders 47, 47 are supported to be movable in the front-rear direction, on the outer surface of the side plates 23, 23, respectively (see FIG. 6).

Cam holes 48, 48 are formed at a predetermined distance at the front and rear, through the slider 47. The cam hole 48 has a straight portion 48a extending forward and rearward and a declining portion 48b that declines for rearward movement according to forward movement, and the front end of the straight portion 48a and the upper end of the declining portion 48b are connected. A supported hole 47a extending forward and rearward is formed at the lower end of the slider 47.

The sliding pins 42a, 42a, . . . are inserted in the cam holes 48, 48, such that the lower holder 37 is movably supported to the sliders 47, 47. In this sate, since the sliding pins 42a, 42a, . . . are inserted in the cam support holes 46, 46 of the supporting frame 21, respectively, from the inner surface of the side plates 23, 23, the lower holder 37 is also movably supported to the supporting frame 21.

The slider 47 is supported to the side plate 23 of the supporting frame 21 to be movable in the front-rear direction, because support protrusion pins 23b, 23b are slidably fitted in the supported hole 47a.

A chassis 49 is mounted on the base frame 20c of the outer case 20 (see FIGS. 6 and 7).

A support member 50 protruding upward is attached to the rear end of the chassis 49 (see FIG. 6). A discharge lever 51 that can horizontally rotate is supported to the upper end of the support member 50. An operated member 52 is connected to the discharge lever 51 and the lower end of the operated member 52 is positioned on the chassis 49.

A first operation motor 53 is disposed on the chassis 49.

A rotary cam 54 is supported to the chassis 49 and an arm lever 55 is connected to the rotary cam 54. One end of the arm lever 55 is connected to the lower end of the operated member 52. A first reduction gear set 56 is supported on the chassis 49 and engaged with the rotary cam 54.

The rotary cam 54 is rotated by a driving force of a first operation motor 53 which is transmitted through the first reduction gear set 56 and the arm lever 55 is operated by the rotation of the rotary cam 54. As the arm lever 55 operates, the operated member 52 operates, such that the discharge lever 51 rotates about the support member 50.

Locking gears (not shown) that are mounted on the sliders 47, 47, respectively, are disposed on the bottom of the chassis 49.

A second operation motor 57 is disposed ahead of the first operation motor 53, on the chassis 49.

The second reduction gear set 58 is supported to the chassis 49 and is partially supported to the underside of the chassis 49, except for a portion. The second gear set 58 is engaged with the locking gears mounted on the sliders 47, 47.

The sliders 47, 47 are moved in the front-rear direction by the driving force of the second motor 57 which is transmitted through the second gear set 58. As the sliders 47, 47 move in the front-rear direction, as described below, the lower holder 37 of the cartridge holder 35 moves in the up-down direction, such that the second shell 4 of the disk cartridge 1 is separated from the first shell 3 or the separated second shell 4 is combined with the first shell 3.

Therefore, the second operation motor 57, the second reduction gear set 58, and the sliders 47, 47 function as a shell-moving mechanism that moves the lower holder 37 of the cartridge holder 35 in the up-down direction such that the second shell 4 is separated/combined from/with the first shell 3. The shell-moving mechanism includes an encoder (not shown) and determines the stop position of the lower holder 37 in the up-down direction on the basis of the information input to the information input sheet 18, which functions as an information input unit, attached to the disk cartridge 1, by using the encoder.

Operation of Cartridge Transporting Device

The operation of the cartridge transporting device 19 is described hereafter (see FIGS. 14 to 32).

First, the initial state before the disk cartridge 1 is inserted in the cartridge transporting device 19 (see FIGS. 14 to 17).

Figure 14:
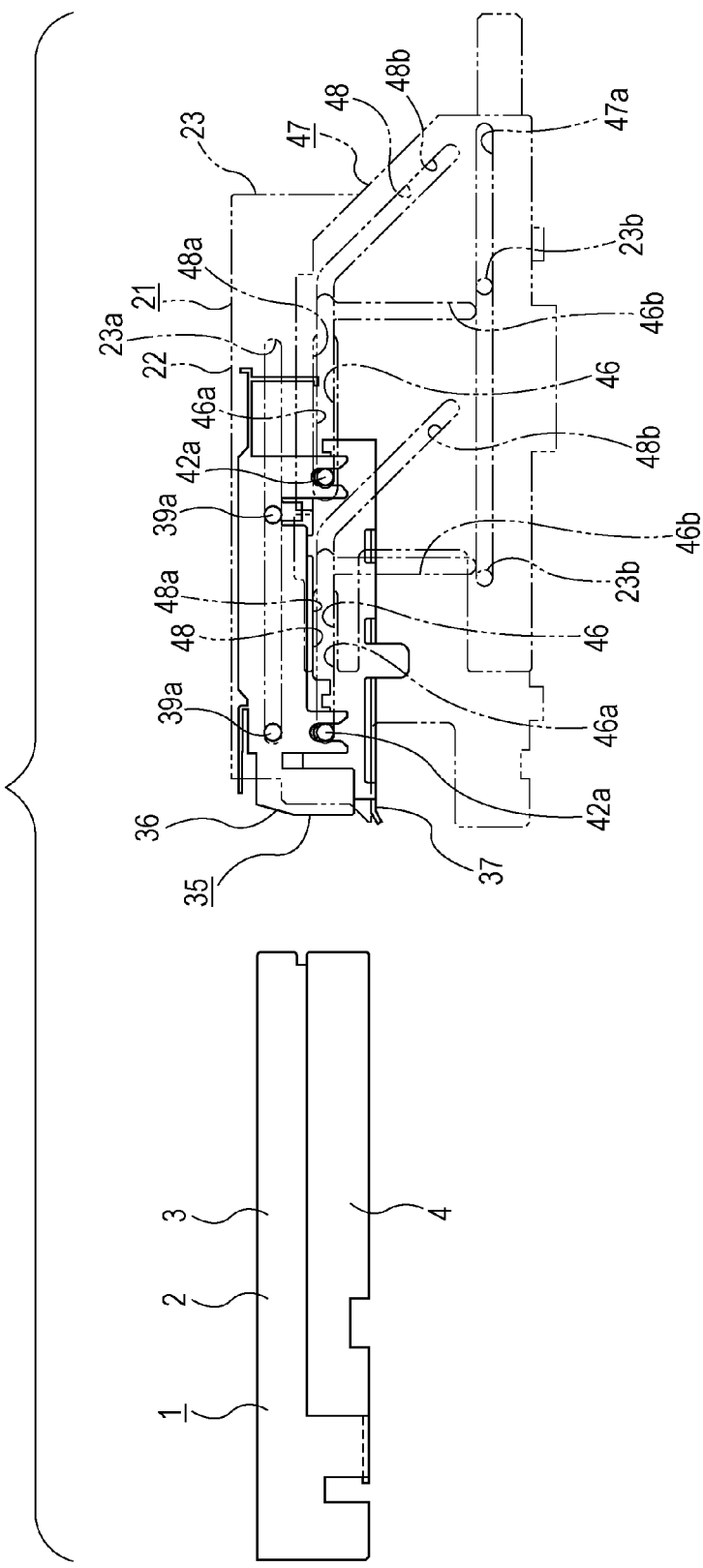
FIG. 14 is a schematic side view showing the operation of the cartridge transporting device together with the FIGS. 15 to 32, before the disk cartridge is inserted in the cartridge holder.

In the initial state, the slider 47 is positioned at a front moving end and the cartridge holder 35 is positioned at a rear moving end (see FIG. 14).

The cartridge holder 35 is held at the insertion position where the disk cartridge 1 is inserted and the sliding pins 39a at the rear portion of the upper holder 36 are fitted in the support holes 23a of the supporting frame 21. The sliding pins 42a of the lower holder 37 are fitted in the rear end of the horizontal portion 46a of the cam support hole 46 of the supporting frame 21 and the rear end of the straight portion 48a of the cam hole 48 of the slider 47.

In the initial state, the discharge lever 51 supported to the upper end of the support member 50 is held to extend substantially in the left-right direction.

Figure 15:
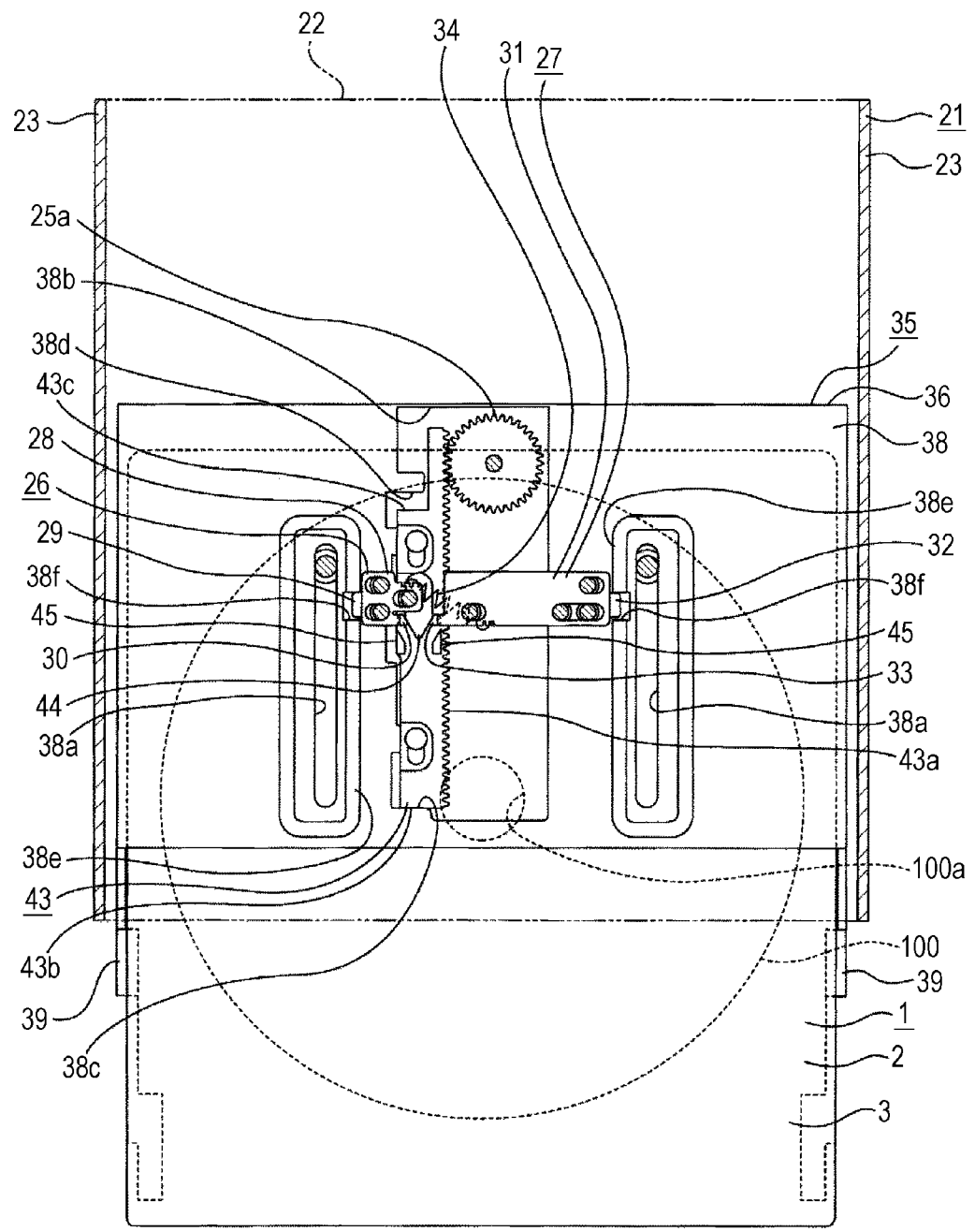
FIG. 15 is a schematic plan view showing when the disk cartridge is inserted in the cartridge holder at an insertion position.
Figure 16:
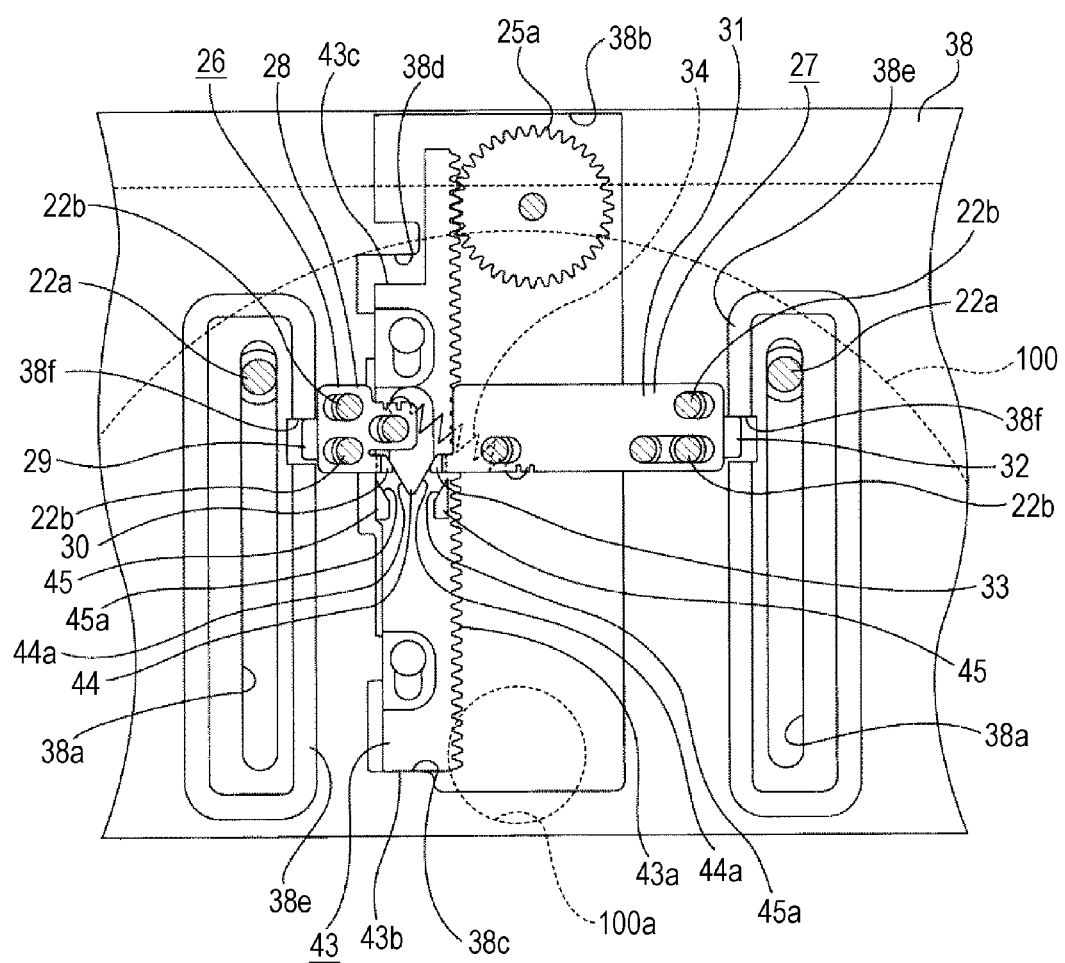
FIG. 16 is a schematic enlarged plan view showing when the disk cartridge is inserted in the cartridge holder at an insertion position.
Figure 17:
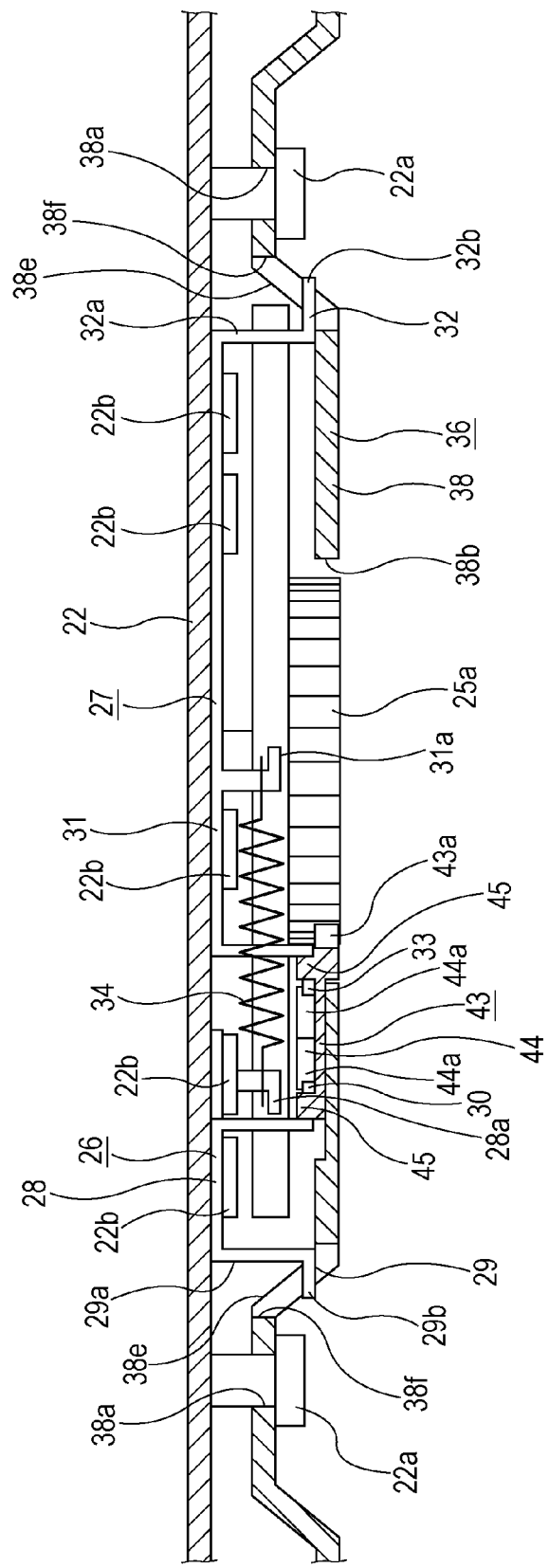
FIG. 17 is an enlarged plan view showing the cartridge holder is locked by the locking member at the insertion position.

In the initial state, as described above, the cartridge holder 35 is positioned at the rear moving end and the first pressing portion 43b of the holder driving member 43 is in contact with the first pressed edge 38c of the cartridge holder 35 (see FIGS. 15 and 16). The front ends of the operation edges 44a, 44a of the locking operation portion 44 of the holder driving member 43 are engaged with the operated portion 30 of the first locking member 26 and the operated portion 33 of the second locking member 27, respectively, such that first locking member 26 and the second locking member 27 are at outer moving ends, that is, the locking positions, against the biasing force of the biasing spring 34 (see FIGS. 16 and 17).

As described above, when the first locking member 26 and the second locking member 27 are at the locking positions, the insertion protrusion 29b of the locking portion 29 of the first locking member 26 and the insertion protrusion 32b of the locking portion 32 of the second locking member 27 are fitted in the locked holes 38f, 38f formed through the top 38 of the cartridge holder 35. Therefore, the cartridge holder 35 is locked by the first locking member 26 and the second locking member 27 at the insertion position, such that movement is controlled in the front-rear direction.

The unlocking portions 45, 45 of the holder driving member 43 are positioned at a predetermined distance behind the locking portion 29 of the first locking member 26 and the locking portion 32 of the second locking member 27 (see FIGS. 15 and 16).

Figure 18:
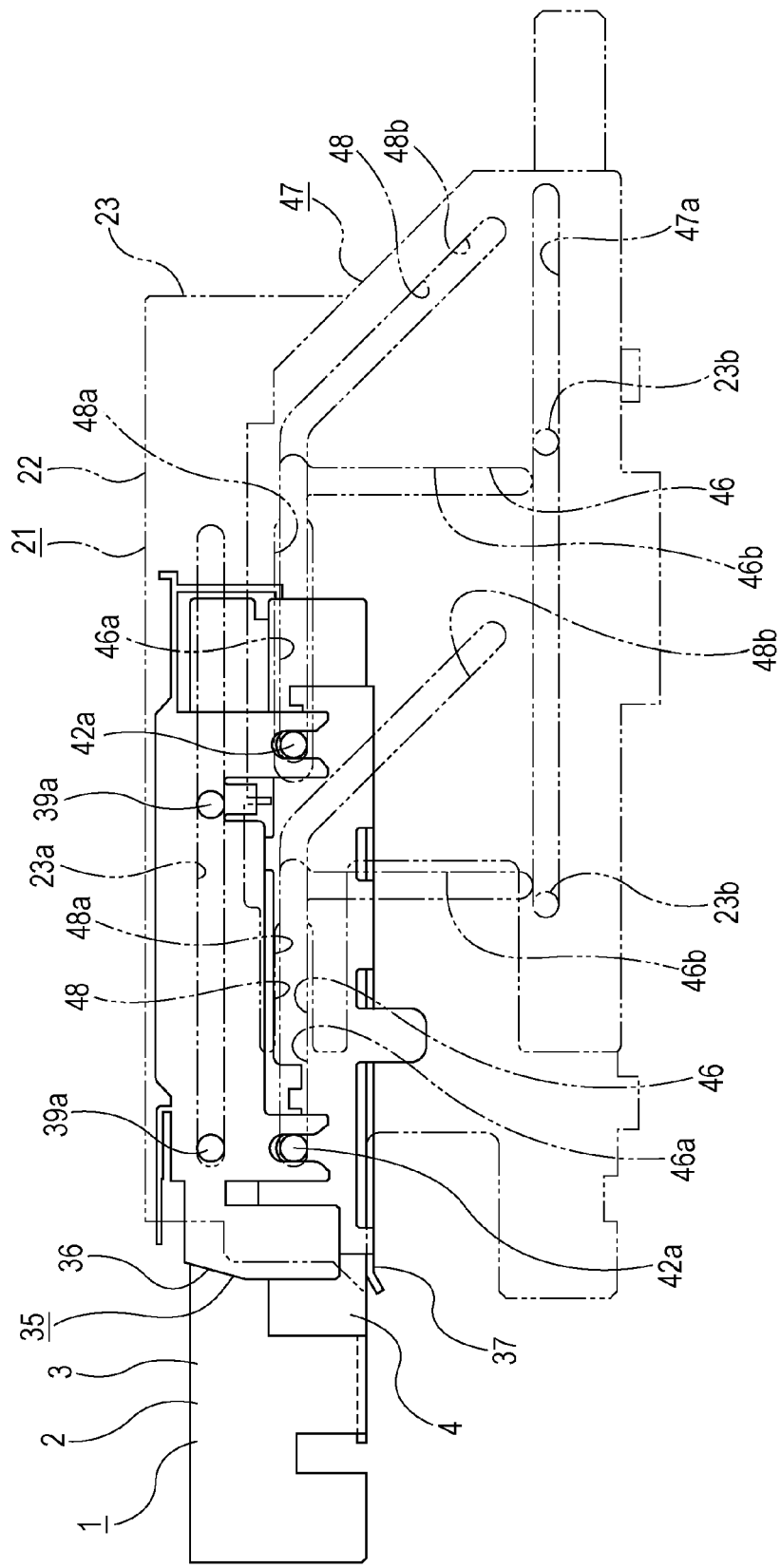
FIG. 18 is a schematic side view showing when the disk cartridge is inserted in the cartridge holder at an insertion position.

When the disk cartridge 1 is inserted from the cartridge inserting/taking-out hole of the panel 20b of the cartridge transporting device 19, the disk cartridge 1 is inserted in the cartridge holder 35 (see FIG. 18). The cartridge holder 35 is inserted into the disk cartridge 1, for example, by hand or a cartridge inserting/taking-out mechanism (not shown).

When the disk cartridge 1 is inserted from the cartridge inserting/taking-out hole of the panel 20b, the shutter 20b is pressed and rotated by the disk cartridge 1.

Figure 19:
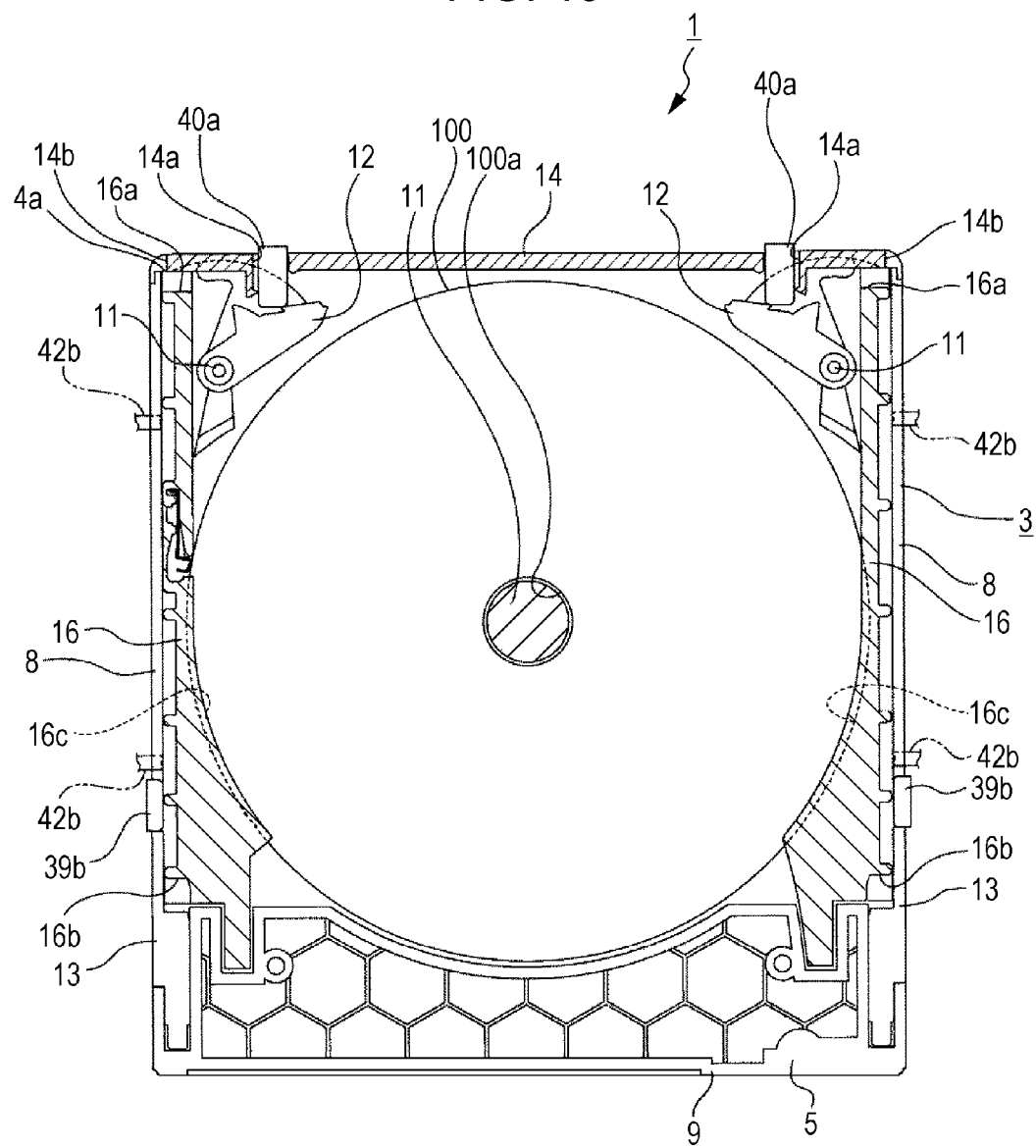
FIG. 19 is a cross-sectional view showing when the disk cartridge is inserted in the cartridge holder and the first shell and the second shell are unlocked, at the insertion position.

As the disk cartridge 1 is inserted from the rear into the cartridge holder 35, the releasing portions 39b, 39b of the upper holder 36 and the holding portions 42b, 42b, ... of the lower holder 37 are inserted into the insertion grooves 2a, 2a formed on the case 2 (see FIG. 19).

When the releasing portions 39b, 39b are inserted in the insertion grooves 2a, 2a, the locking sliders 13, 13 are pressed rearward by the releasing portions 39b, 39b when the disk cartridge 1 is moved to the back side of the cartridge holder 35. As the locking sliders 13, 13 are pressed rearward by the releasing portions 39b, 39b, the locking sliders 13, 13 are moved rearward against the biasing force of the coil springs and the locking protrusions 13a, 13a are drawn out from the second locking grooves 16b, 16b of the second shell 4. As the locking protrusions 13a, 13a are drawn out from the second locking grooves 16b, 16b, the first shell 3 and the second shell 4 locked by the locking sliders 13, 13 are unlocked.

Further, the unlocking portions 40a, 40a formed at the cartridge holder 35 are inserted into the insertion holes 14a, 14a of the opening/closing panel 14, respectively. As the unlocking portions 40a, 40a are inserted in the insertion holes 14a, 14a, the locking levers 12, 12 are pressed rearward by the unlocking portions 40a, 40a. As the locking levers 12, 12 are pressed rearward by the unlocking portions 40a, 40a, the locking levers 12, 12 are rotated against the biasing force of the coil springs and the locking protrusions 12a, 12a are drawn out from the first locking grooves 16a, 16a of the second shell 4. As the locking protrusions 12a, 12a are drawn out from the first locking grooves 16a, 16a, the first shell 3 and the second shell 4 locked by locking levers 12, 12 are unlocked.

Unlocking of the first shell 3 and the second shell 4 locked by the locking levers 12, 12 is performed simultaneously with unlocking of the first shell 3 and the second shell 4 locked by the locking sliders 13, 13.

As the first shell 3 and the second shell 4 locked by the locking levers 12, 12 and the locking sliders 13, 13 are unlocked, the first shell 3 and the second shell 4 are separable in the up-down direction.

When the first shell 3 and the second shell 4 are separable in the up-down direction, a switch (not shown) is operated by the disk cartridge 1 and the moving motor 24 starts rotating in one direction.

Figure 20:
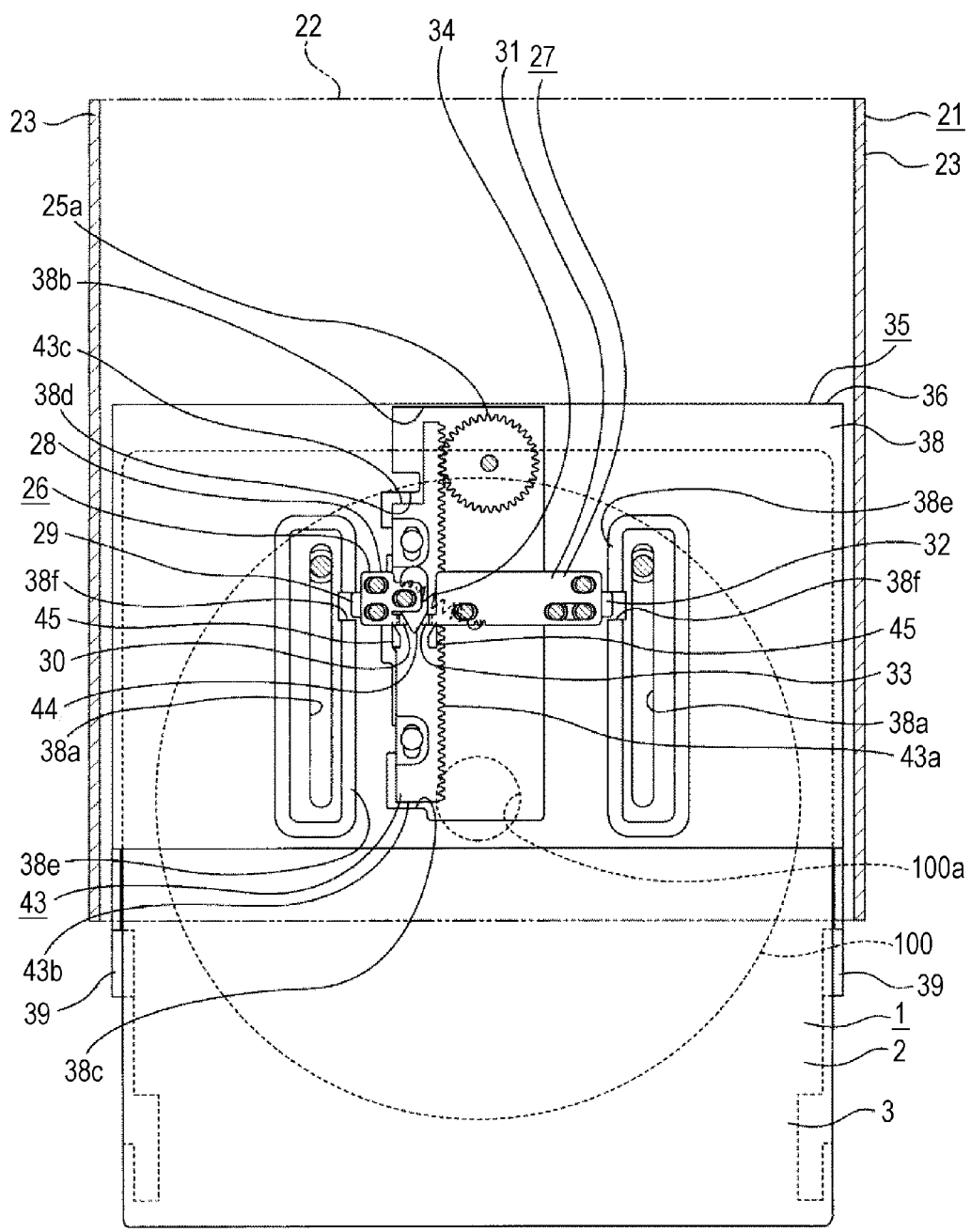
FIG. 20 is a schematic plan view showing the state right after the holder driving member is moved, when moving from the insertion position to the drawn-in position of the cartridge holder.

As the moving motor 24 starts rotating in one direction, the driving force of the moving motor 24 is transmitted to the holder driving member 43 through the gear set 25, such that the holder driving member 43 moves forward and the first pressing portion 43b is separated forward from the first pressed edge 38c (see FIG. 20).

In this operation, the inclining edge 30a of the operated portion 30 and the inclining edge 33a of the operated portion 33 come in contact with the operation edges 44a, 44a of the locking operation portion 44 of the holder driving member 43. Therefore, the first locking member 26 and the second locking member 27 are moved toward the non-locking position to be closer to each other by the biasing force of the biasing spring 34. As the first locking member 26 and the second locking member 27 are moved toward the non-locking position, the locking portions 29, 32 are drawn out from the locked holes 38f, 38f of the cartridge holder 35.

As the holder driving member 43 moves forward, the releasing edges 45a, 45a of the unlocking portions 45, 45 come in contact with the operated portion 30 of the first locking member 26 and the operated portion 33 of the second locking member 27.

Figure 21:
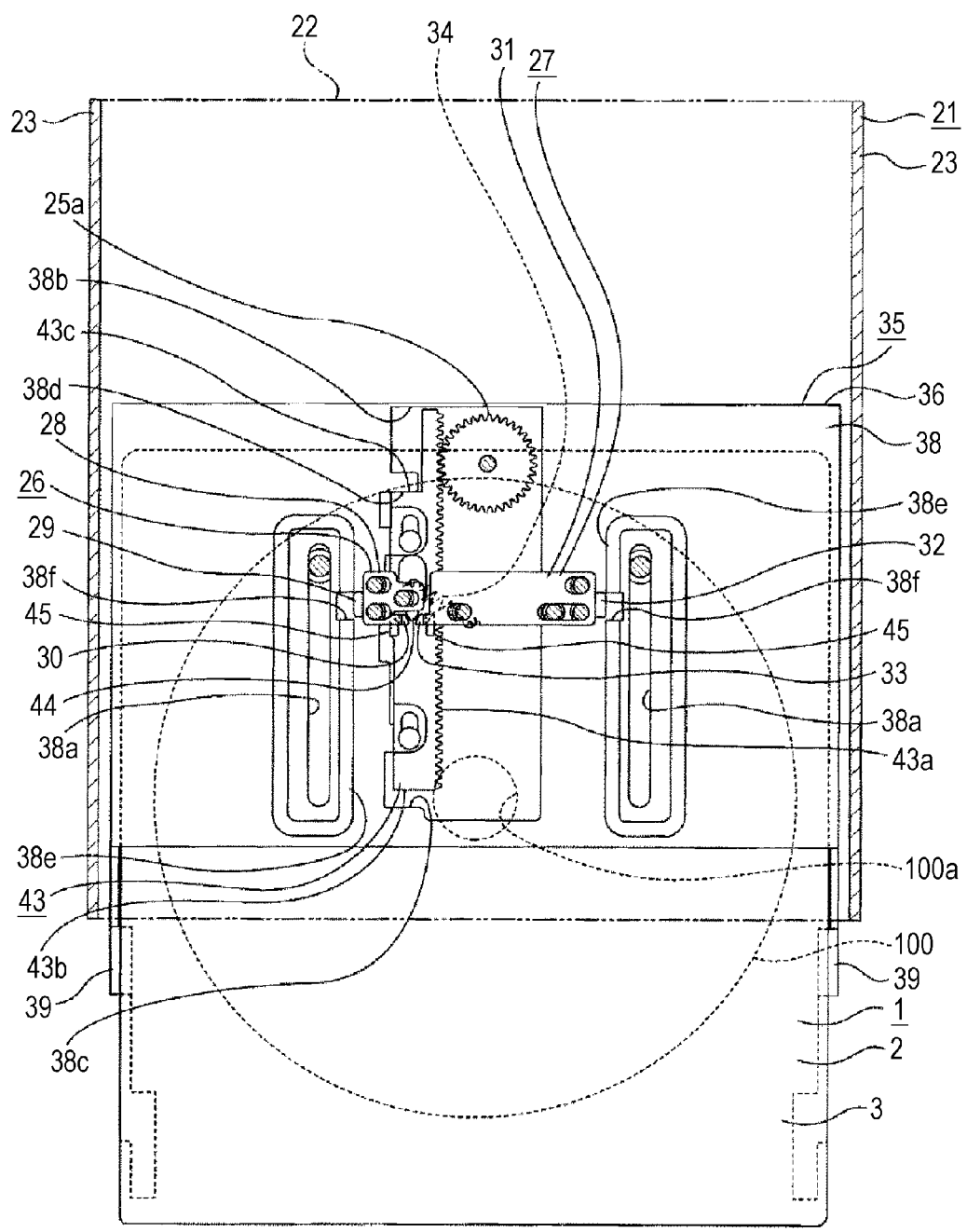
FIG. 21 is a schematic plan view showing when the holder driving member is moved and the cartridge holder locked by the locking member is unlocked, continuing from FIG. 20.
Figure 22:
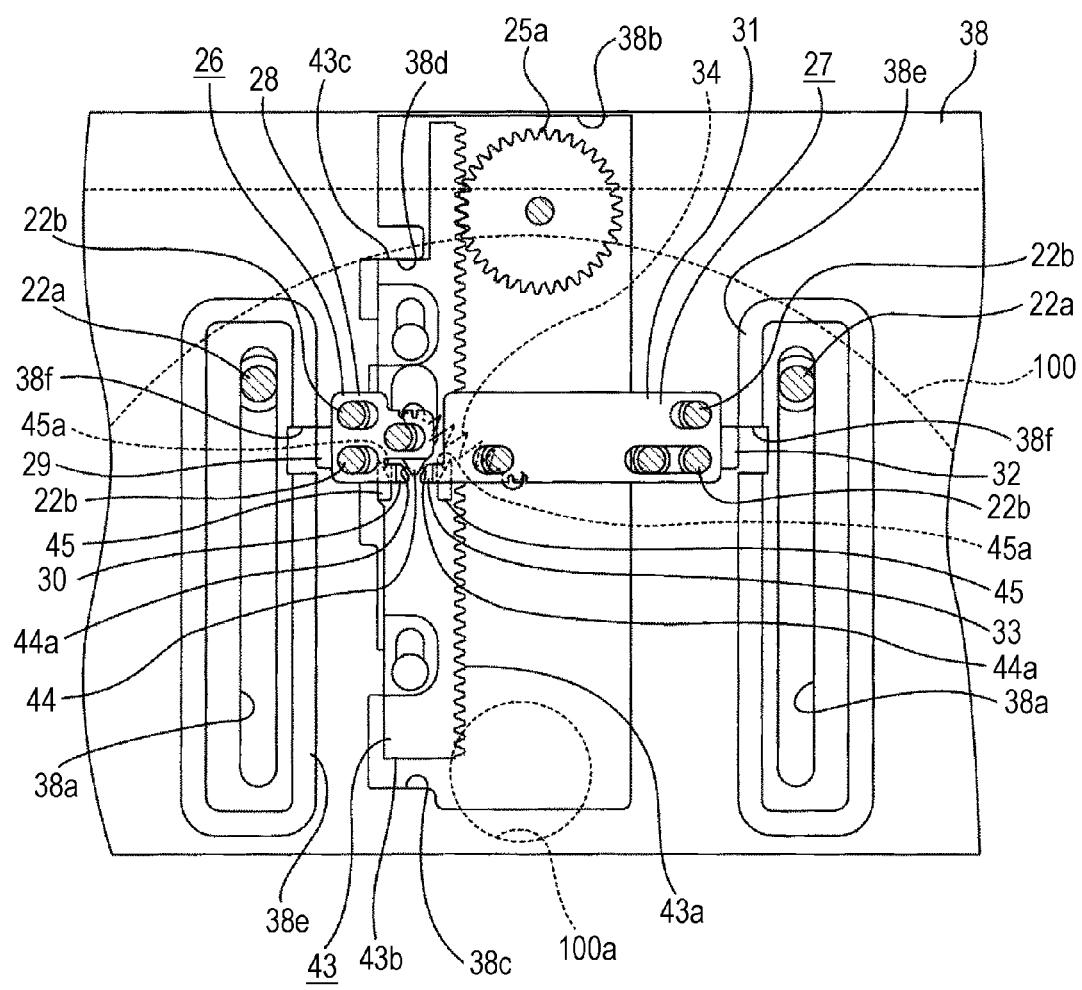
FIG. 22 is a schematic enlarged plan view showing when the holder driving member is moved and the cartridge holder locked by the locking member is unlocked.
Figure 23:
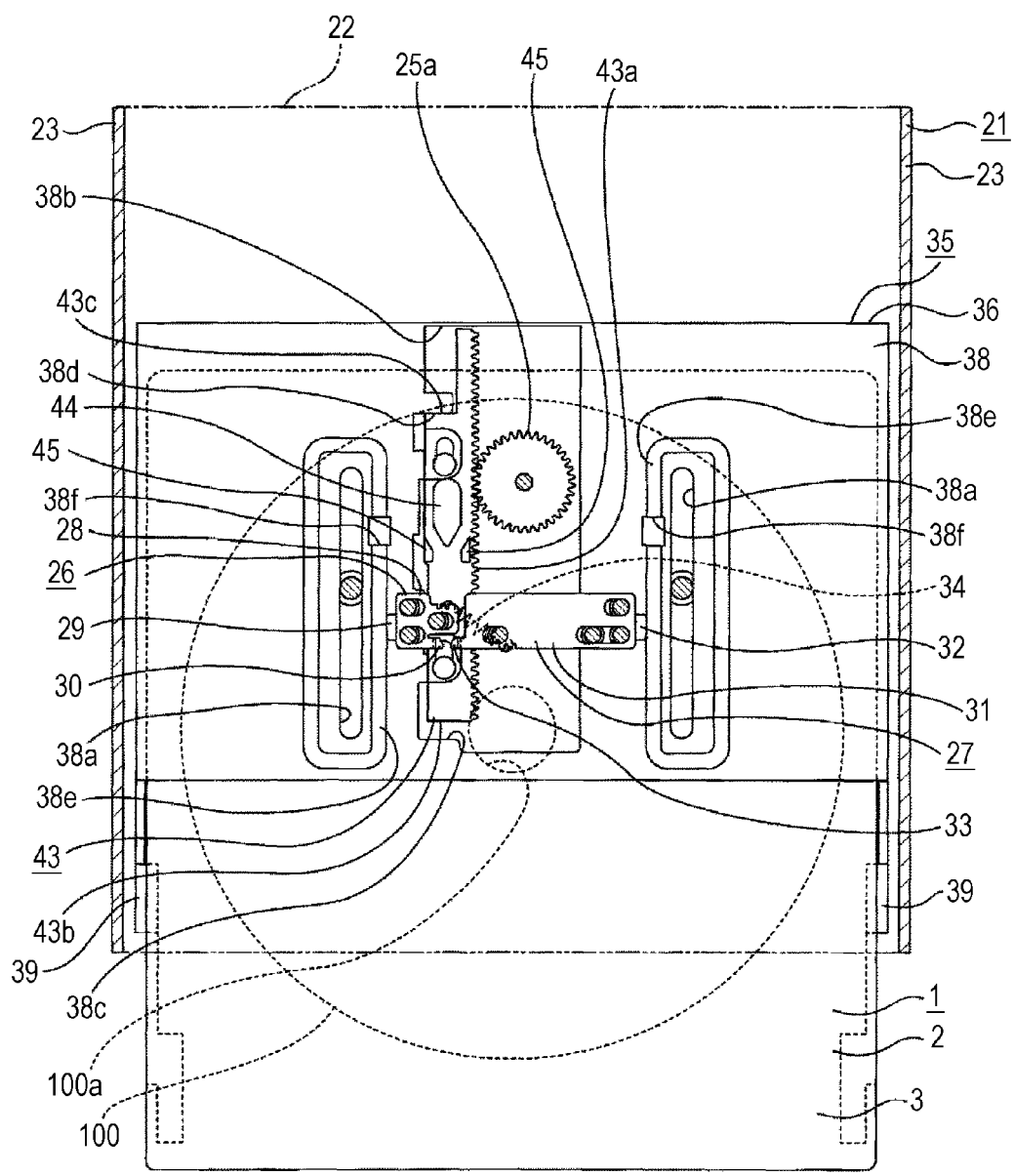
FIG. 23 is a schematic plan view showing when the holder driving member is moved and the cartridge holder is moved toward the drawn-in position, continuing from FIG. 21.
Figure 24:
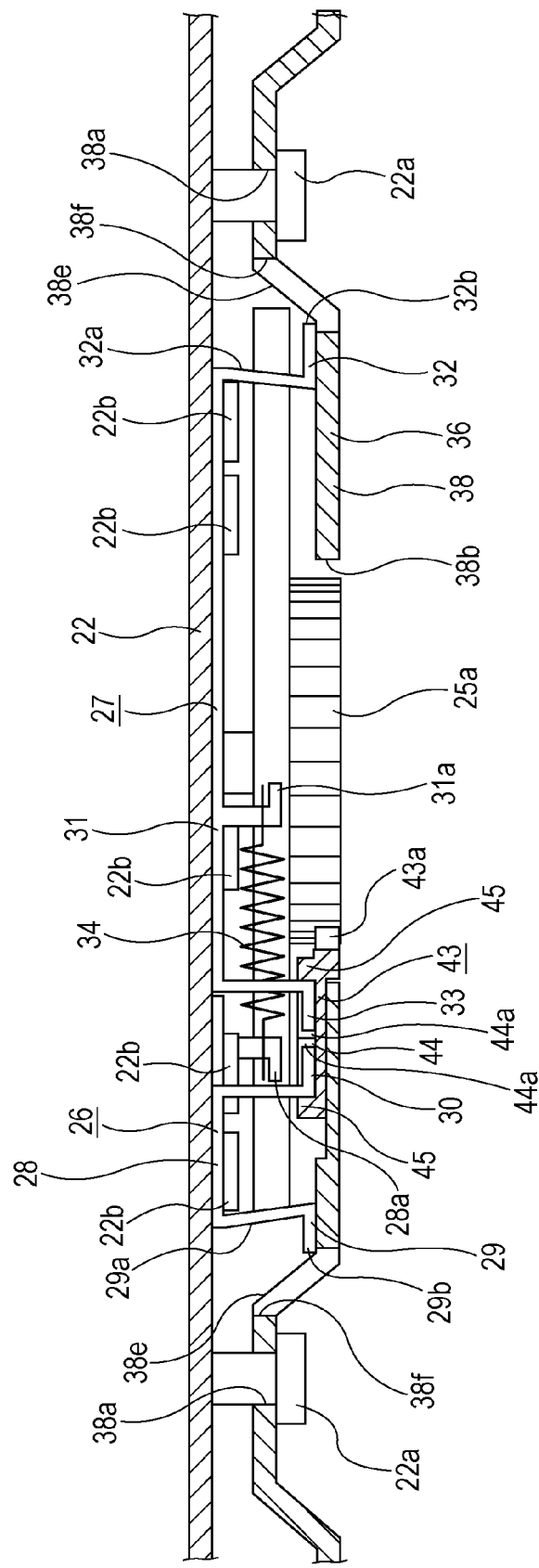
FIG. 24 is an enlarged cross-sectional view showing when the cartridge holder is moved toward the drawn-in position and the locking portion of the locking member is elastically deformed.

When the holder driving member 43 further moves forward, the second pressing portion 43c of the holder driving member 43 comes in contact with the second pressed edge 38d of the cartridge holder 35 (see FIGS. 21 and 22).

The first locking member 26 and the second locking member 27 are further moved closer to each other by the biasing force of the biasing spring 34, such that the inclining edges 30a, 33a of the operated portions 30, 33 are moved away from the operation edges 44a, 44a of the locking operation portion 44 to the non-locking position. Therefore, the locking portion 29 of the first locking member 26 and the locking portion 32 of the second locking member 27 are drawn out from the operated holes 38f, 38f of the cartridge holder 35, such that the first locking member 26 and the second locking member 27 locked to the cartridge holder 35 are unlocked.

As described above, in the cartridge transporting device 19, when the operation of the locking operation portion 44 of the holder driving member 43 to the operated portions 30, 33 of the first locking member 26 and the second locking member 27 is removed, the first locking member 26 and the second locking member 27 are moved to the unlocking positions by the biasing force of the biasing spring 34 and unlocked from the cartridge holder 35.

Therefore, since the first locking member 26 and the second locking member 27 are moved to the unlocking positions by a simple configuration, it is possible to unlock the cartridge holder 35 while simplifying the mechanism in the cartridge transporting device 19.

As the holder driving member 43 moves forward, the releasing edges 45a, 45a of the unlocking portions 45, 45 are drawn out and come in contact with the operated portion 30 of the first locking member 26 and the operated portion 33 of the second locking member 27.

Therefore, the first locking member 26 and the second locking member 27 are moved to the non-locking positions even by the operation of the unlocking portions 45, 45 and unlocked from the cartridge holder 35, such that it is possible to perform reliable unlocking from the cartridge holder 35 while simplifying the mechanism of the cartridge transporting device 19.

Unlocking the cartridge holder 35 by using the unlocking portions 45, 45 is particularly useful, for example, when the biasing spring 34 is separated from the first locking member 26 or the second locking member 27 by vibration or the like, or when the biasing force is reduced across the aging of the biasing spring 34.

The moving motor 24 keeps rotating in one direction. Since the second pressing portion 43c of the holder driving member 43 is in contact with the second pressed edge 38d of the cartridge holder 35, as the holder driving member 43 moves forward, the second pressed edge 38d is pressed by the second pressing portion 43c, such that the cartridge holder 35 integrally moves forward with the holder driving member 43 (see FIG. 23).

When the cartridge holder 35 moves forward, the curved portions 32c, 32c of the insertion protrusions 29b, 32b of the first locking member 26 and the second locking member 27 slide and come in contact with the locked holes 38f, 38f, respectively, such that the insertion protrusions 29b, 32b slide onto the inclining portions 38e, 38e from the locked holes 38f, 38f. Therefore, the first locking member 26 and locking portions 29, 32 of the second locking member 27 elastically deform such that the lower ends come close to each other (see FIG. 24).

Figure 25:
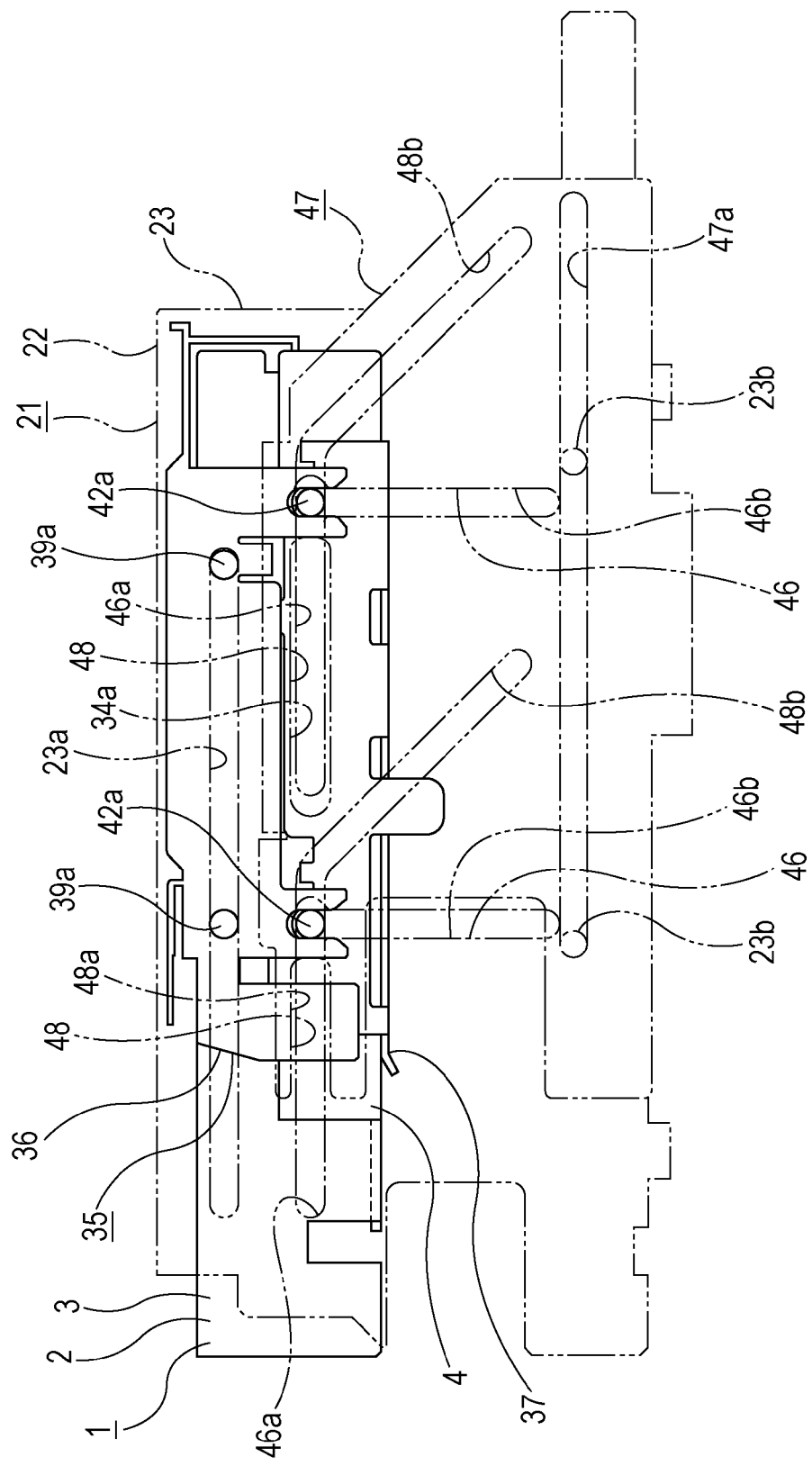
FIG. 25 is a schematic side view showing when the cartridge holder is moved from the drawn-in position.

In the cartridge holder 35, the sliding pin 39a at the front of the upper holder 36 moves to the front end of the support hole 23a of the supporting frame 21 and the sliding pin 42a of the lower holder 37 moves to the front end of the horizontal portion 46a of the cam support hole 46 of the supporting frame 21 and the front end of the straight portion 48a of the cam hole 48 of the slider 47 (see FIG. 25). Therefore, the cartridge holder 35 reaches the drawn-in position where it is drawn into the supporting frame 21 (see FIGS. 25 and 26). When the cartridge holder 35 moves to the drawn-in position, the moving motor 24 stops rotating.

Figure 26:
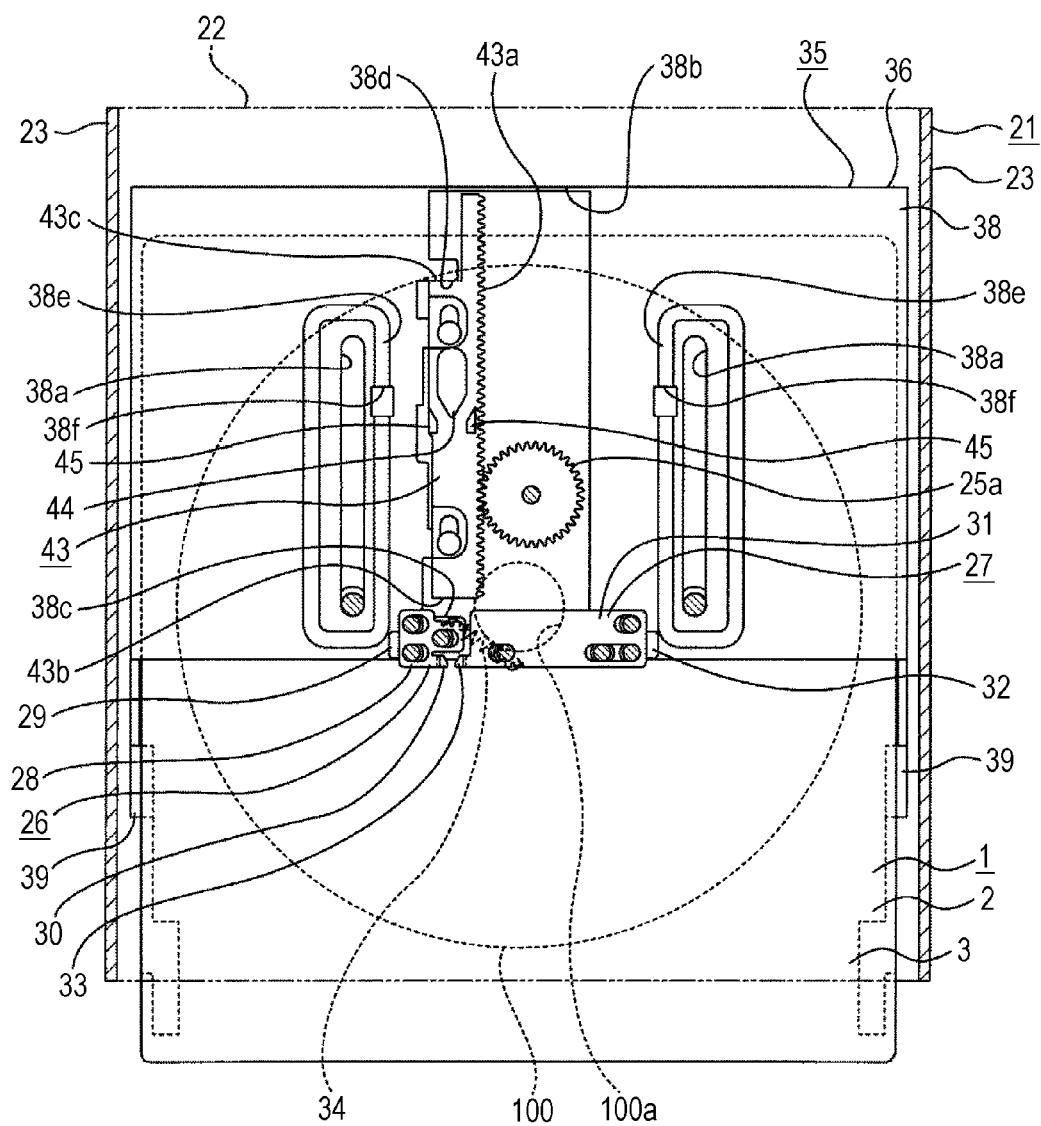
FIG. 26 is a schematic plan view showing when the cartridge holder is moved to the drawn-in position, continuing from FIG. 23.

With the cartridge holder 35 moved to the drawn-in position, the locking operation portion 44 and the unlocking portions 45, 45 of the holder driving member 43 move forward away from the first locking member 26 and the second locking member 27 (see FIG. 26).

The position where the sliding pin 39a at the front of the upper holder 36 is fitted in the front end portion of the support hole 23a and the sliding pin 42a of the lower holder 37 is fitted in the front end portion of the straight portion 48a of the cam hole 48, that is, the drawn-in position is the position where the upper holder 36 and the lower holder 37 of the cartridge holder 35 start to separate.

The entire disk cartridge 1 is received in the outer case 20, when the cartridge holder 35 has moved to the drawn-in position, such that the cartridge inserting/taking-out position of the panel 20b is closed again by the shutter 20d.

The cartridge holder 35 is positioned at the upper moving end, when having moved to the drawn-in position (see FIG. 25).

When the cartridge holder 35 has moved to the drawn-in position, the information input to the information input sheet 18 attached to the disk cartridge 1 is read by a reading device (not shown). Therefore, the information, such as the information of the disk type recording medium 100, 100, . . . received in the case 2 and the number of the received disk type recording medium 100, 100, . . . and the pitch is read by the reading device.

When the cartridge holder 35 has moved to the drawn-in position, the second operation motor 57 starts rotating and the driving force of the second operation motor 57 is transmitted to the sliders 47, 47 through the locking gear, such that the sliders 47, 47 are moved rearward with respect to the supporting frame 21. The slider 47 moves rearward while the supported hole 47a is guided to the support pins 23b, 23b of the supporting frame 21.

Figure 27:
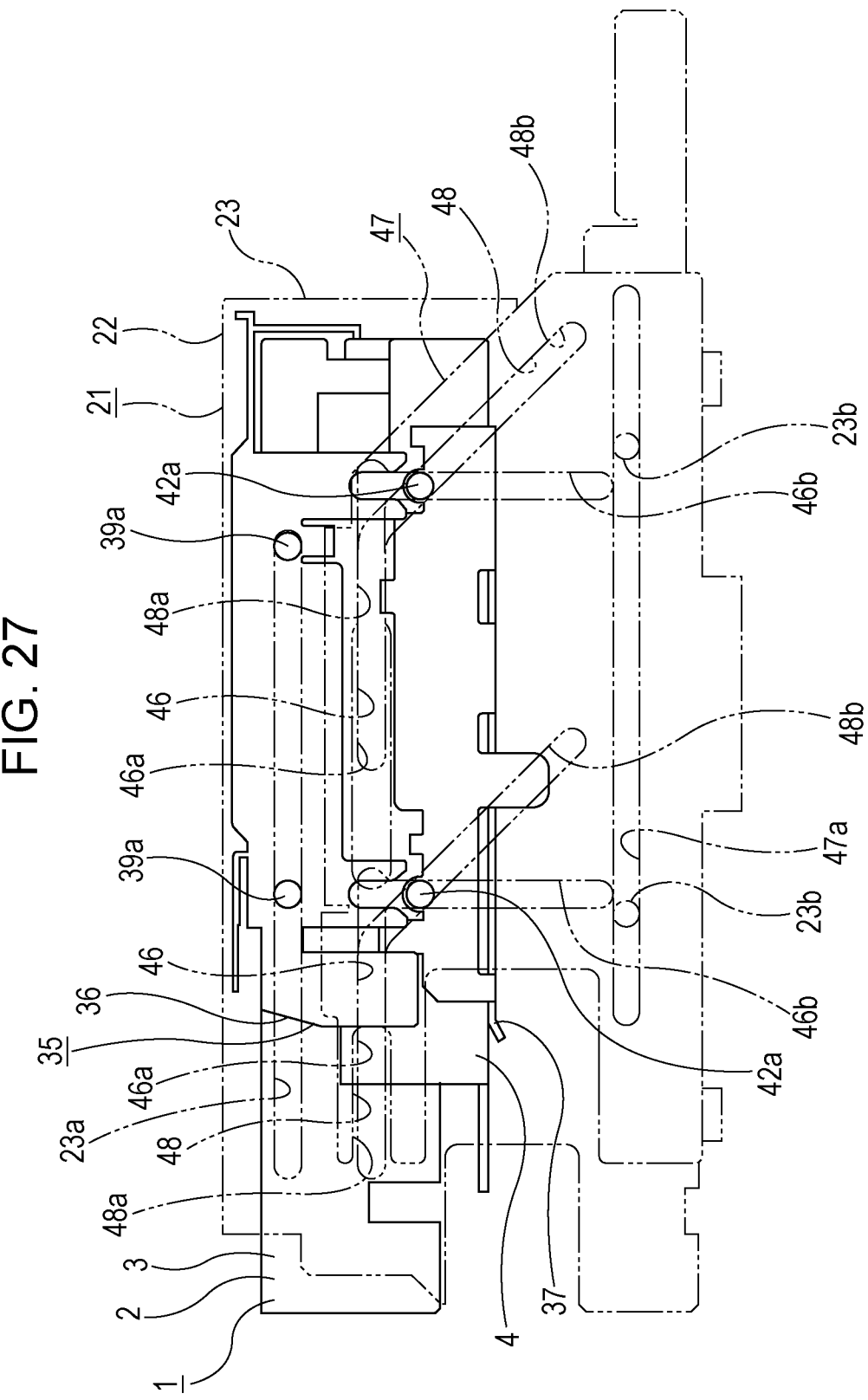
FIG. 27 is a schematic side view showing when the lower holder of the cartridge holder is moved downward.

As the slider 47 moves rearward, the sliding pin 42a of the lower holder 37 of the cartridge holder 35 moves down on the declining portion 48b of the cam hole 48 and moves downward on the vertical portion 46b of the cam support hole 46 of the supporting frame 21, such that the lower holder 37 moves down (see FIG. 27). In the disk cartridge 1, the first shell 3 is held by the unlocking portions 40a, 40a and the locking portions 39b, 39b of the upper holder 36 and the second shell 4 is held by the holding portions 42b, 42b, . . . of the lower holder 37, such that the first shell 3 does not move downward and the second shell 4 integrally moves down with the lower holder 37. Therefore, the first sell 3 and the second shell 4 are separated.

Figure 28:
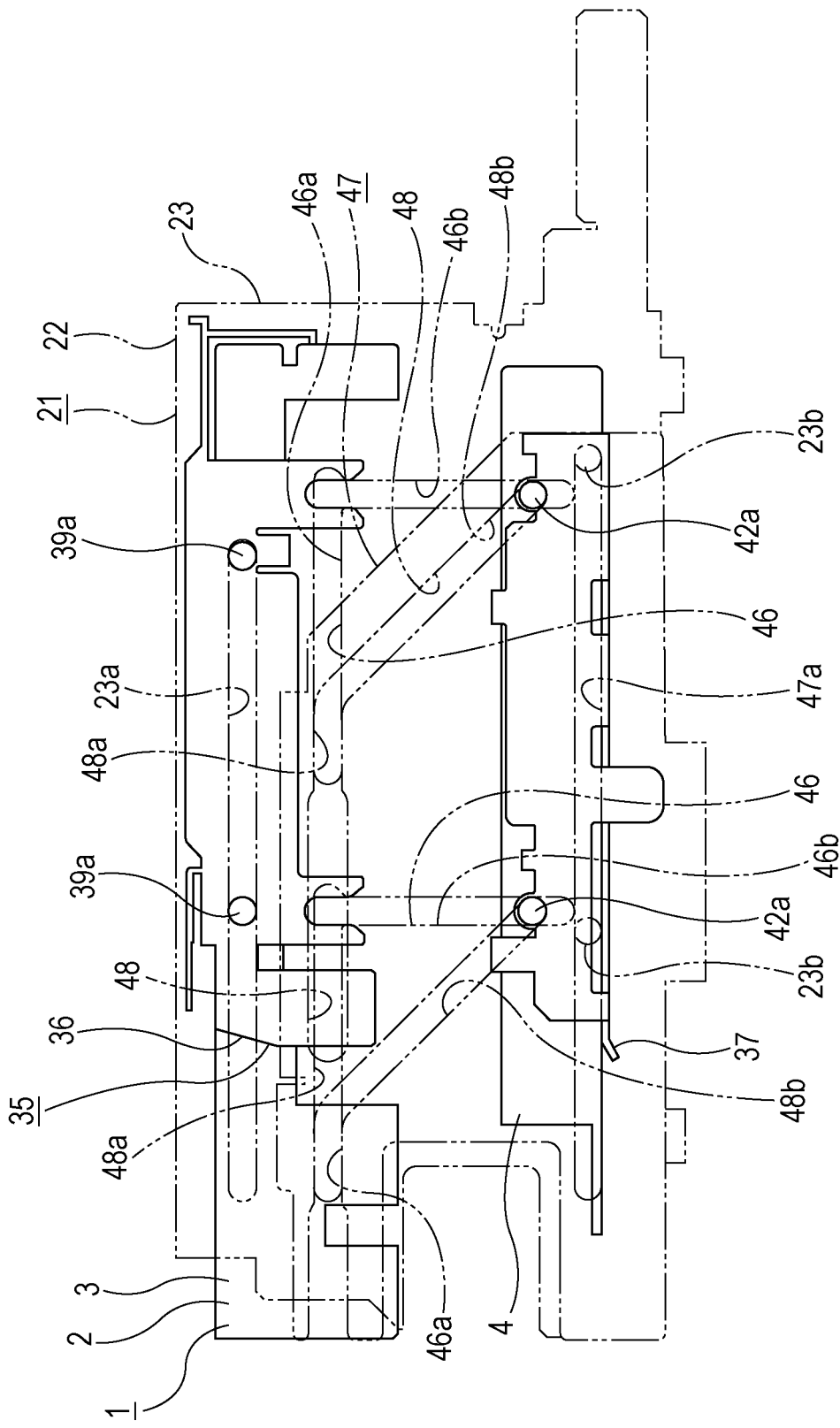
FIG. 28 is a schematic side view showing when the lower holder of the cartridge holder is moved to a lower moving end.

The slider 47 is moved rearward by the driving force of the second operation motor 57 and the lower holder 37 moves, for example, to the lower moving end (see FIG. 28). With the lower holder 37 moved to the lower moving end, the sliding pin 42a of the lower holder 37 is fitted in the lower end of the declining portion 48b of the cam hole 48 and the lower end of the vertical portion 46b of the cam support hole 46.

Figure 29:
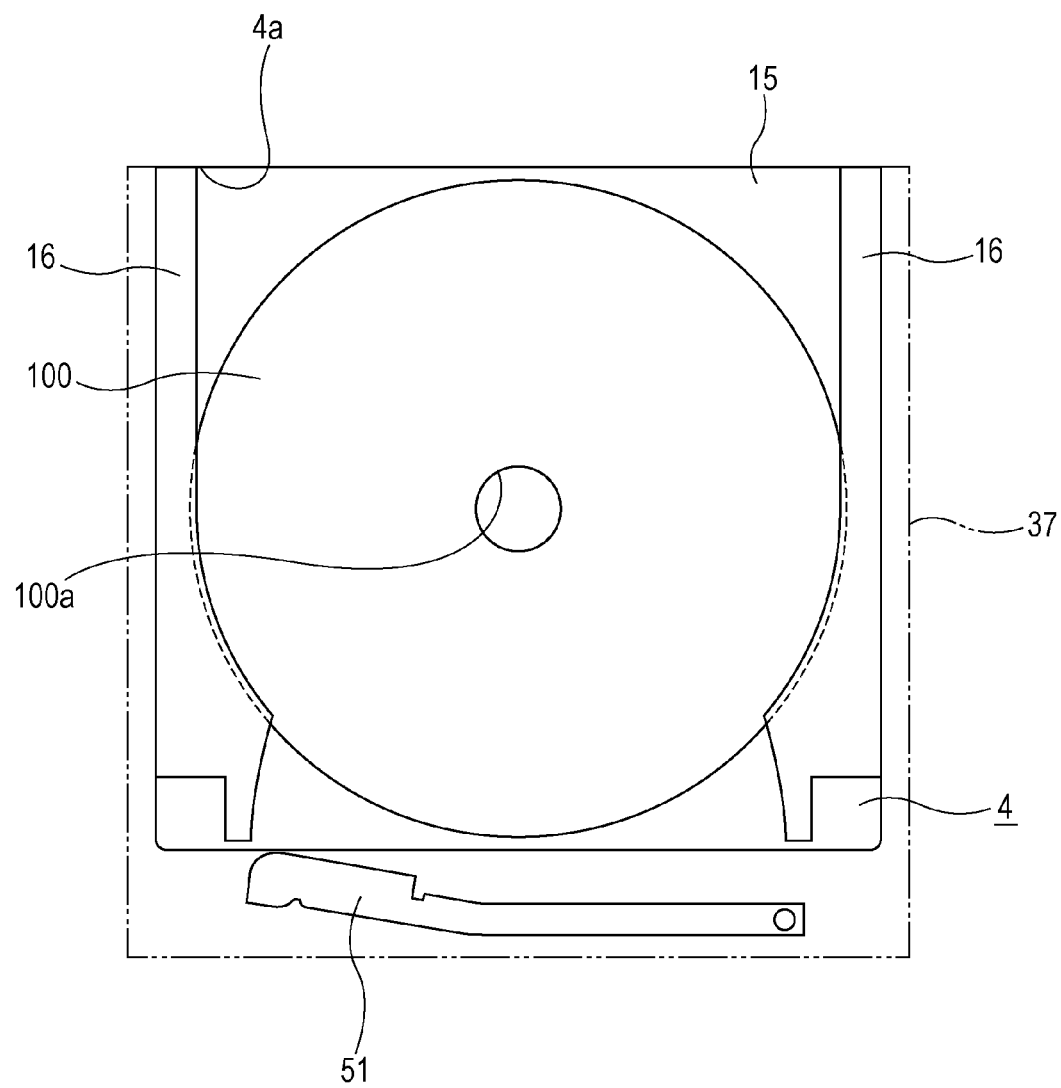
FIG. 29 is a schematic plan view showing when the disk type recording medium is not discharged from the second shell by the discharge lever.

While the lower holder 37 moves, the discharge lever 51 is positioned behind the second shell 4 held by the lower holder 37 (see FIG. 29).

When the lower holder 37 stops moving down, the first operation motor 53 starts rotating and the discharge lever 51 is rotated.

Figure 30:
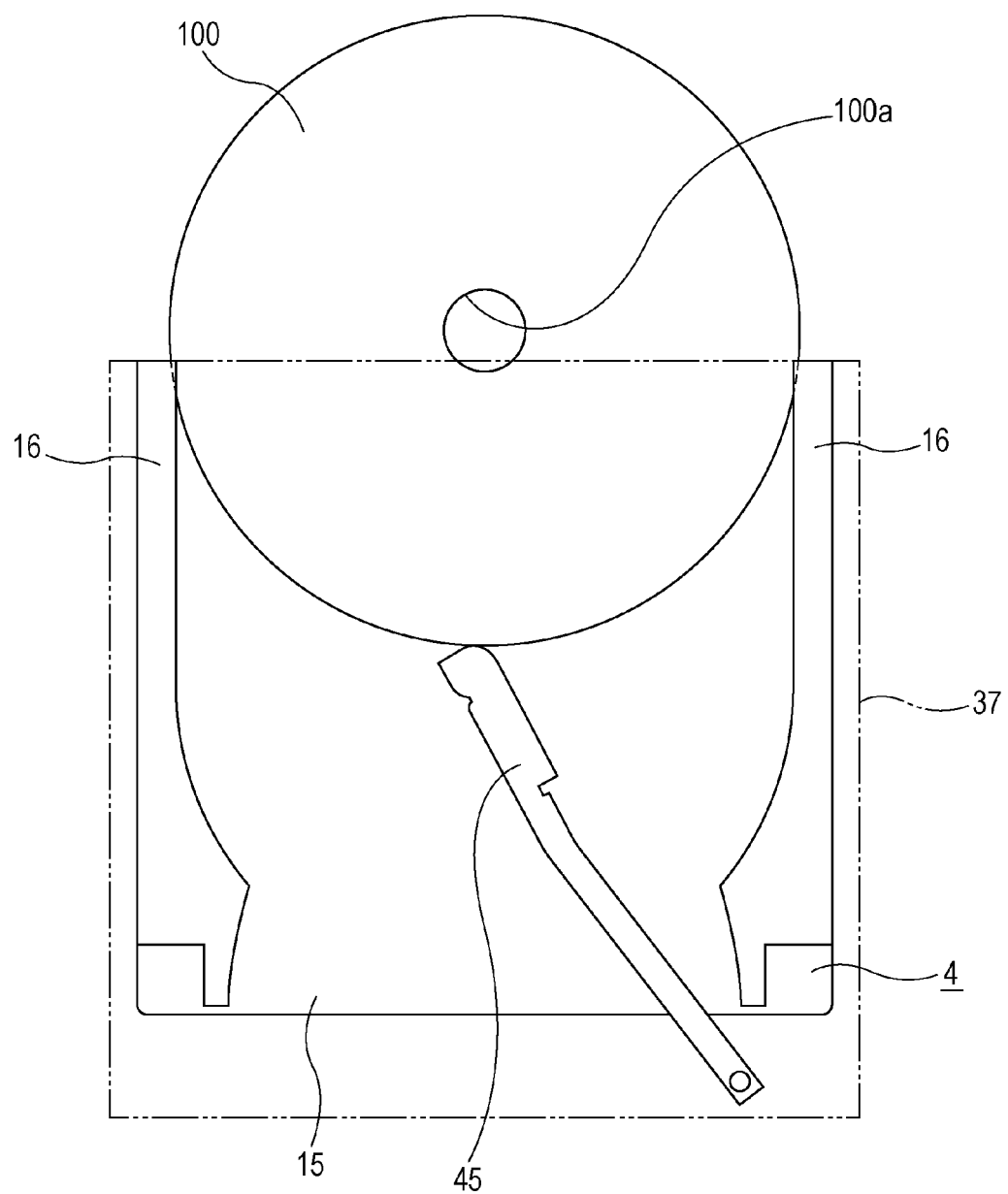
FIG. 30 is a schematic plan view showing when the disk type recording medium is discharged from the second shell by the discharge lever.

As the discharge lever 51 rotates, the outer circumference of the disk type recording medium 100 at the height corresponding to the stop position of the lower holder 37 is pressed forward by the discharge lever 51, such that a portion of the disk type recording medium 100 is discharged forward from the second shell 4 (see FIG. 30).

As a portion of the disk type recording medium 100 is discharged forward from the second shell 4 by the discharge lever 51, the first operation motor 53 reverses and the discharge lever 51 is rotated to the initial position.

The disk type recording medium 100 with a portion discharged forward from the second shell 4 is mounted onto a disk driver device (not shown) by a disk transporting mechanism (not shown), such that an information signal of the disk type recording medium 100 is recorded or reproduced.

When recording or reproducing of the information signal is finished, the disk type recording medium 100 is carried again by the disk transporting mechanism and received and held in the second shell 4.

When the disk type recording medium 100 is inserted and held in the second shell 4, the second operation motor 57 starts reversing, such that the sliders 47, 47 are moved forward with respect to the supporting frame 21.

As the slider 47 moves forward, the sliding pin 42a of the lower holder 37 moves up on the declining portion 48b of the cam hole 48 and moves up on the vertical portion 46b of the cam support hole 46 of the supporting frame 21, such that the lower holder 37 moves up integrally with the second shell 4.

The lower holder 37, for example, moves to the upper moving end, such that the second shell 4 is combined with the first shell 3 (see FIG. 25). With the lower holder 37 moved to the upper moving end, the sliding pin 42a of the lower holder 37 is fitted in the front end of the straight portion 48a of the cam hole 48 and the upper end of the vertical portion 46b of the support hole 46 of the supporting frame 21.

When the lower holder 37 has moved to the upper moving end from the lower moving end, the upper holder 36 is at the drawn-in position.

When the lower holder 37 moves from the lower moving end to the upper moving end and the second shell 4 is combined with the first shell 3, the moving motor 24 starts rotating in the other direction.

Figure 31:
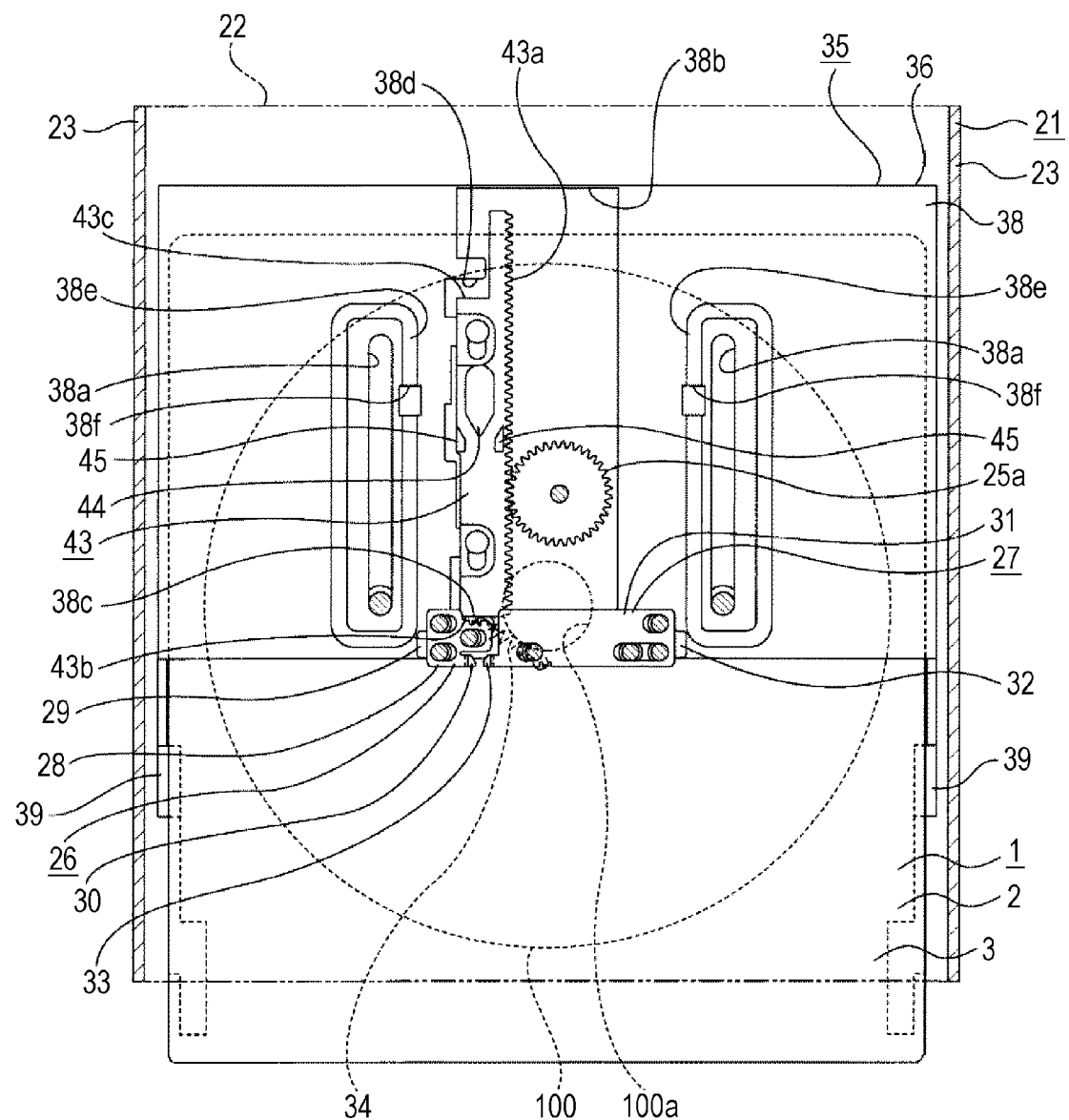
FIG. 31 is a schematic plan view showing the state of right after the holder driving member is moved, when moving from drawn-in position to the insertion position of the cartridge holder.
Figure 32:
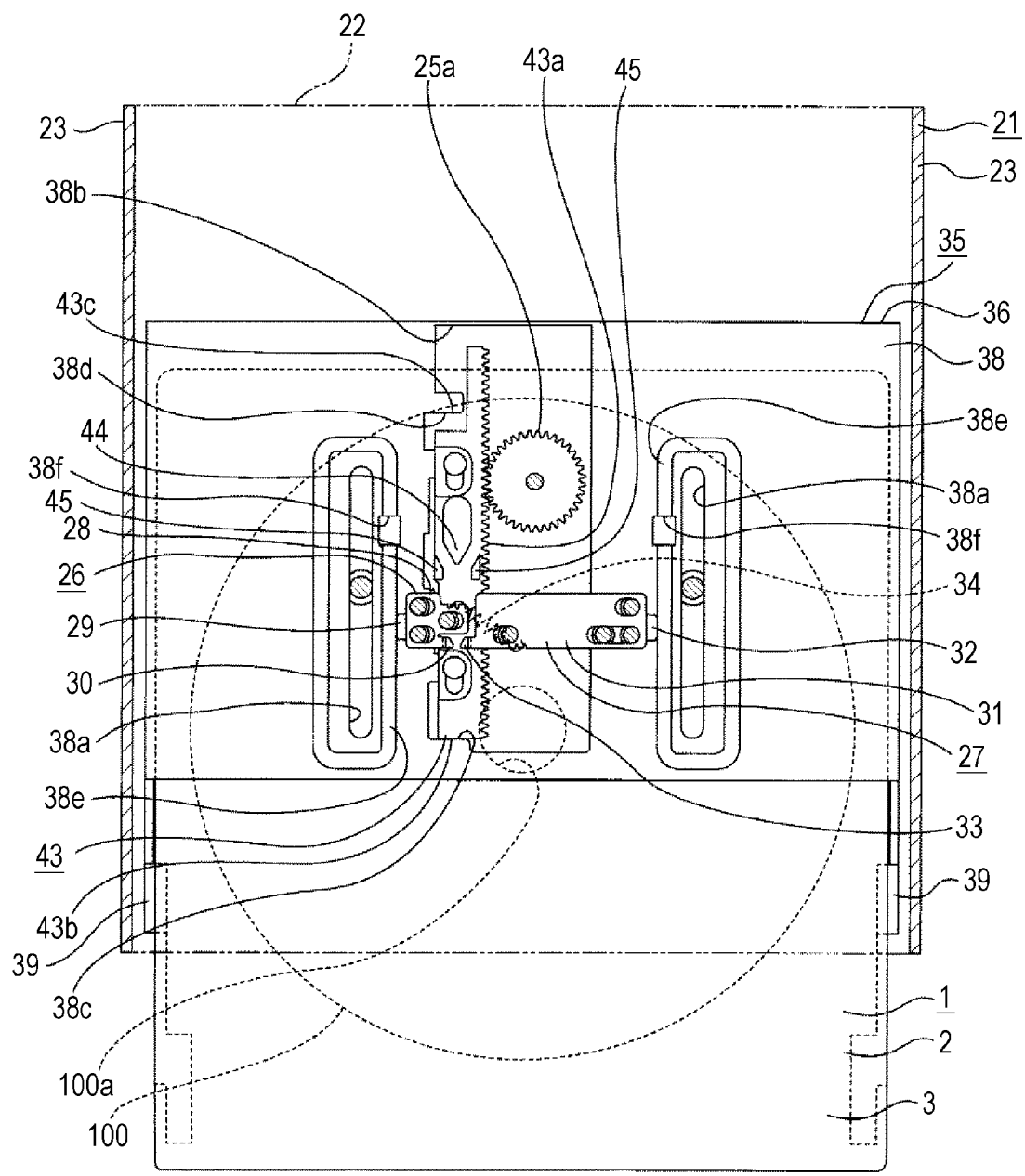
FIG. 32 is a schematic plan view showing when the holder driving member is moved and the cartridge holder is moved toward the drawn-in position to the insertion position, continuing from FIG. 31.

As the moving motor 24 starts rotating in the other direction, the driving force of the moving motor 24 is transmitted to the holder driving member 43 through the gear set 25, such that the holder driving member 43 moves rearward, the second pressing portion 43c is separated forward from the second pressed edge 38d, and the first pressing portion 43b comes in contact with the first pressed edge 38c (see FIG. 31).

The moving motor 24 keeps rotating in the other direction. Since the first pressing portion 43b is in contact with the first pressed edge 38c, the first pressed edge 38c is pressed by the first pressing portion 43b by the rearward movement of the holder driving member 43, such that the cartridge holder 35 moves rearward to the insertion position integrally with the holder driving member 43 (see FIG. 32).

When the cartridge holder 35 moves toward the insertion position integrally with the holder driving member 43, in the first locking member 26 and the second locking member 27, the inclining edge 30a of the operated portion 30 and the inclining portion 33a of the operated portion 33 slide and come in contact with the operation edges 44a, 44a of the locking operation portion 44 of the holder driving member 43, respectively. Therefore, the first locking member 26 and the second locking member 27 are moved toward the locking position, away from each other against the biasing force of the biasing spring 34.

As the first locking member 26 and the second locking member 27 are moved toward the locking position, the insertion protrusions 29b, 32b of the locking portions 29, 32 are inserted into the locked holes 38f, 38f of the cartridge holder 35.

As the cartridge holder 35 moves to the insertion position (see FIG. 20) and the insertion protrusions 29b of the first locking member 26 and the insertion protrusion 32b of the second locking member 27 are inserted and fitted in the locked holes 38f, 38f of the cartridge holder 35, respectively, the first locking member 26 and the second locking member 27 reach again the locking positions, such that the cartridge holder 35 is locked again at the insertion position. The locking portions 29, 32 of the first locking member 26 and the second locking member 27 elastically are restored from the elastic deformation and the insertion protrusions 29b, 32b are inserted and fitted in the locked holes 38f, 38f (see FIG. 17).

As described above, in the cartridge transporting device 19, since the locking portions 29, 32 of the first locking member 26 and the second locking member 27 are elastically restored and inserted and engaged with the locked holes 38f, 38f, it is possible to reliably lock the cartridge holder 35 at the insertion position.

When the cartridge holder 35 moves to the insertion position, the moving motor 24 stops rotating. When the cartridge holder 35 has moved to the insertion position, a portion of the disk cartridge 1 protrudes rearward from the cartridge inserting/taking-out hole of the panel 20b. The rear sliding pin 39a of the upper holder 36 is fitted in the rear end of the support hole 23a of the supporting frame 21. The sliding pins 42a of the lower holder 37 are fitted in the rear end of the horizontal portion 46a of the cam support hole 46 of the supporting frame 21 and the rear end of the straight portion 48a of the cam hole 48 of the slider 47.

Further, the disk cartridge 1 moves rearward and is drawn out from the cartridge holder 35. The cartridge holder 35 is drawn out from the disk cartridge 1, for example, by hand or a cartridge inserting/taking-out mechanism (not shown).

As the disk cartridge 1 moves rearward with respect to the cartridge holder 35, the unlocking portions 40a, 40a of the upper holder 36 are drawn out from the insertion holes 14a, 14a of the opening/closing panel 14. As the unlocking portions 40a, 40a are drawn out from the insertion holes 14a, 14a, the locking levers 12, 12 are turned by the biasing force of the locking spring and the locking protrusions 12a, 12a are inserted and engaged with the first locking grooves 16a, 16a of the second shell 4, such that the second shell 4 is combined with the first shell 3 and locked thereto.

Further, as the disk cartridge 1 moves rearward with respect to the cartridge holder 35, the locking sliders 13, 13 pressed by the releasing portions 39b, 39b of the upper holder 36 are released. As the locking sliders 13, 13 pressed by the releasing portions 39b, 39b are released, the locking sliders 13, 13 are moved forward by the biasing force of the coil spring, such that the locking protrusions 13a, 13a are inserted and engaged with the second locking grooves 16b, 16b of the second shell 4, respectively, and the second shell 4 is combined with the first shell 3 and locked thereto.

CONCLUSION

As described above, in the cartridge transporting device 19, when the cartridge holder 35 is locked by the first locking member 26 and the second locking member 27 in the insertion position and starts moving from the insertion position of the cartridge holder 35 to the drawn-in position, the holder driving member 43 moves, such that the cartridge holder 35 locked by the first locking member 26 and the second locking member 27 is unlocked.

Therefore, even though the disk cartridge 1 is inserted in the cartridge holder 35 by a large force at the insertion position, it is possible to reduce load applied to the holder driving member 43, the gear set 25, and the moving motor 24 while preventing large load from being applied to the holder driving member 43, the gear set 25, and the moving motor 24 through the cartridge holder 35.

In particular, the teeth of the gears 25a, 25a, . . . of the gear set 25 or the locking portion 43a of the holder driving member 43 are not easily broken off or chipped and it is possible to prevent the components from being damaged or broken.

Further, in the cartridge transporting device 19, the holder driving member 43 that moves the cartridge holder 35 between the insertion position and the drawn-in position has the lock operation portion 44 such that the cartridge holder 35 is locked by moving the first locking member 26 and the second locking member 27 with the locking operation portion 44.

Therefore, since the cartridge holder 35 is moved by the holder driving member 43 and locked by the first locking member 26 and the second locking member 27, it is possible to lock the cartridge holder 35 at the insertion position while reducing the number of components and simplifying the mechanism in the cartridge transporting device 19.

The first locking member 26 and the second locking member 27 move perpendicular to the movement direction of the cartridge holder 35 and the locking portions 29, 32 are fitted in the locked holes 38f, 38f, such that the cartridge holder 35 is locked at the insertion position.

Therefore, it is possible to keep the cartridge holder 35 stably locked by reliably controlling movement of the cartridge holder 35.

Further, the first locking member 26 and the second locking member 27 are formed in plate shapes and the width direction of the locking portions 29, 32 inserted and fitted in the locked holes 38f, 38f, respectively, is the same as the insertion direction of the disk cartridge 1 in the cartridge holder 35.

Therefore, the first locking member 26 and the second locking member 27 are difficult to deform in the insertion direction of the cartridge holder 35 in the disk cartridge 1 and it is possible to keep the cartridge holder 35 stably locked by reliably controlling movement of the cartridge holder 35.

Further, two locking members, the first locking member 26 and the second locking member 27 are disposed in the cartridge transporting device 19 as locking member, and the cartridge holder 35 is locked at the insertion position by the first locking member 26 and the second locking member 27.

Therefore, since the cartridge holder 35 is locked by the first locking member 26 and the second locking member 27 that move in the insertion direction of the cartridge holder 35 in the disk cartridge 1, it is possible to more stably keep the cartridge holder 35 locked at the insertion position.

Further, the locking portions 29, 32 of the first locking member 26 and the second locking member 27 are disposed at the ends where the first locking member 26 and the second locking member 27 are moved away from each other, that is, the left end of the first locking member 26 and the right end of the second locking member 27 are provided.

Therefore, since the distance between two positions that lock the cartridge holder 35 is large in the direction perpendicular to the insertion direction of the disk cartridge 1 in the cartridge holder 35, it is possible to keep the cartridge holder stably locked by more reliably controlling movement of the cartridge holder 35.

Further, in the cartridge transporting device 19, the holder driving member 43 that moves the cartridge holder 35 between the insertion position and the drawn-in position has the lock operation portion 44 such that the locking operation portion 44 slides and comes in contact with the first locking member 26 and the second locking member 27. Further, the first locking member 26 and the second locking member 27 move to the locking position and the locking operation portion 44 is moved away from the first locking member 26 and the second locking member 27 such that the first locking member 26 and the second locking member 27 are moved to the non-locking position.

Therefore, since the cartridge holder 35, the first locking member 26, and the second locking member 27 are moved by the holder driving member 43, it is not necessary to provide exclusive mechanisms for moving the cartridge holder 35, the first locking member 26, and the second locking member 27 and it is possible to lock and unlock the cartridge holder 35 while reducing the number of components and simplifying the mechanism in the cartridge transporting device 19.

Further, in the cartridge transporting device 19, the holder driving member 43 that moves the cartridge holder 35 between the insertion position and the drawn-in position has the locking operation portion 44 and the unlocking portions 45, 45, and the locking operation portion 44 slides and comes in contact with the first locking member 26 and the second locking member 27, such that the first locking member 26 and the second locking member 27 are moved to the locking position. Further, the unlocking portions 45, 45 slide and come in contact with the first locking member 26 and the second locking member 27 while the locking operation portion 44 moves away from the first locking member 26 and the second locking member 27 such that the first locking member 26 and the second locking member 27 can move to the non-locking position.

Therefore, since the cartridge holder 35, the first locking member 26, and the second locking member 27 are moved by the holder driving member 43, it is not necessary to provide exclusive mechanisms for moving the cartridge holder 35, the first locking member 26, and the second locking member 27 and it is possible to reliably unlock the cartridge holder 35 while reducing the number of components and simplifying the mechanism.

PRESENT TECHNOLOGY

The present disclosure may be implemented by the following configuration.

(1) A cartridge transporting device includes: a cartridge holder into which a cartridge receiving a recording medium is inserted and which holds the inserted cartridge; a supporting frame that supports the cartridge holder to freely move between an insertion position where the cartridge is inserted and a drawn-in position where the cartridge is drawn-in from the insertion position; a locking member that moves between a locking position where the cartridge holder is locked and a non-locking position where the cartridge holder is unlocked, moves to the locking position, and locks the cartridge holder at the insertion position; a holder driving member that is movable in a predetermined direction and moves the cartridge holder between the insertion position and the drawn-in position; and a moving mechanism that moves the holder driving member in the predetermined direction, wherein when the cartridge holder starts to move from the insertion position to the drawn-in position, the holder driving member moves such that the cartridge holder locked by the locking member is unlocked.

(2) In the cartridge transporting device described in (1), the holder driving member has a locking operation portion and the locking member is moved from the non-locking position to the locking position by the operation of the locking operation portion of the holder driving member, when the cartridge holder moves from the drawn-in position to the insertion position.

(3) In the cartridge transporting device described in (2), the locking member has a locking portion and the cartridge holder has a locked portion, and the locking member moves perpendicular to the insertion direction of the cartridge in the cartridge holder such that the locking portion is engaged with the lock portion to lock the cartridge holder.

(4) In the cartridge transporting device described in (3), the locking portion of the locking member is formed in a plate shape, the locked portion of the cartridge holder is formed as a locked hole, the locking portion is inserted and fitted in the locked hole, thereby the cartridge holder is locked, and the width direction of the locking portion is the same as the insertion direction of the cartridge in the cartridge holder.

(5) In the cartridge transporting device described in (3) or (4), the locking portion of the locking member is elastically deformable, the locked portion of the cartridge holder is formed as a locked hole, and the locking portion is elastically restored from elastic deformation, thereby the locking portion is inserted and engaged with the locked hole.

(6) In the cartridge transporting device described in any one of (3) to (5), two locking members are provided and moved away from and closer to each other such that the cartridge holder is locked and unlocked.

(7) In the cartridge transporting device described in any one of (3) to (6), two locking members are provided and moved away from and closer to each other, and the locking portions of the two locking members are disposed at the ends of the locking members in the directions in which the two locking members are spaced apart from each other.

(8) In the cartridge transporting device described in (6) or (7), the holder driving member has a locking operation portion and a biasing spring that biases the locking members to come closer to each other, the locking members are moved from the non-locking position to the locking position by the operation of the locking operation portion, and when the operation of the locking operation portion to the locking member is removed, the locking members are moved from the locking position to the non-locking position by the biasing force of the biasing spring.

(9) In the cartridge transporting device described in (8), as the holder driving member moves in one direction, the cartridge holder is pressed by the holder driving member and moved from the drawn-in position to the insertion position, as the holder driving member moves in the other direction, the cartridge holder is pressed by the holder driving member and moved from the insertion position to the drawn-in position, as the holder driving member moves in one direction, the locking operation portion slides and comes in contact with the locking members and the locking members move from the non-locking position to the locking position, and as the holder driving member moves in the other direction, the locking operation portion spaces apart from the locking members and the locking members move from the locking position to the non-locking position.

(10) In the cartridge transporting device described in any one of (6) to (9), the holder driving member has a locking operation portion and an unlocking portion, the locking members are moved from the non-locking position to the locking position by the operation of the locking operation portion, and when the operation of the locking operation portion to the locking members is removed, the locking members are moved from the locking position to the non-locking position by the operation of the unlocking position.

(11) In the cartridge transporting device described in (10), as the holder driving member moves in one direction, the cartridge holder is pressed by the holder driving member and moved from the drawn-in position to the insertion position, as the holder driving member moves in the other direction, the cartridge holder is pressed by the holder driving member and moved from the insertion position to the drawn-in position, as the holder driving member moves in one direction, the locking operation portion slides and comes in contact with the locking members and the locking members move from the non-locking position to the locking position, and as the holder driving member moves in the other direction, the locking operation portion spaces apart from the locking members, the unlocking portion slides and comes in contact with the locking members, and the locking members move from the locking position to the non-locking position.

The detailed shapes and structures of the parts described in the preferred embodiments described above are just examples of the details for implementing the present disclosure and the technical range of the present disclosure should not be construed as being limited.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A cartridge transporting device comprising:
   a cartridge holder into which a cartridge receiving a recording medium is inserted and which holds the inserted cartridge;
   a supporting frame that supports the cartridge holder to freely move between an insertion position where the cartridge is inserted and a drawn-in position where the cartridge is drawn-in from the insertion position;
   a locking member that moves between a locking position where the cartridge holder is locked and a non-locking position where the cartridge holder is unlocked, moves to the locking position, and locks the cartridge holder at the insertion position;
   a holder driving member that is movable in a predetermined direction and moves the cartridge holder between the insertion position and the drawn-in position; and
   a moving mechanism that moves the holder driving member in the predetermined direction,
   wherein when the cartridge holder starts to move from the insertion position to the drawn-in position, the holder driving member moves such that the cartridge holder locked by the locking member is unlocked,
   wherein the locking member has a locking portion and the cartridge holder has a locked portion, wherein the locking member moves perpendicular to an insertion direction of the cartridge in the cartridge holder such that the locking portion is engaged with the lock portion to lock the cartridge holder, wherein the locking portion of the locking member is formed in a plate shape, wherein the locked portion of the cartridge holder is formed as a locked hole, wherein the locking portion is inserted and fitted in the locked hole, thereby the cartridge holder is locked, and wherein a width direction of the locking portion is the same as the insertion direction of the cartridge in the cartridge holder.

2. The cartridge transporting device according to claim 1, wherein the holder driving member has a locking operation portion, and the locking member is moved from the non-locking position to the locking position by an operation of the locking operation portion of the holder driving member, when the cartridge holder moves from the drawn-in position to the insertion position.

3. The cartridge transporting device according to claim 1, wherein the locking portion of the locking member is elastically deformable, the locked portion of the cartridge holder is formed as the locked hole, and the locking portion is elastically restored from elastic deformation, thereby the locking portion is inserted and engaged with the locked hole.

4. The cartridge transporting device according to claim 1, wherein two locking members are provided and moved away from and closer to each other such that the cartridge holder is locked and unlocked.

5. The cartridge transporting device according to claim 1, wherein two locking members are provided and moved away from and closer to each other, and locking portions of the two locking members are disposed at ends of the two locking members in the directions in which the two locking members are spaced apart from each other.

6. The cartridge transporting device according to claim 5, wherein the holder driving member has a locking operation portion and a biasing spring that biases the two locking members to come closer to each other, the two locking members are moved from the non-locking position to the locking position by an operation of the locking operation portion, and when the operation of the locking operation portion to the locking member is removed, the two locking members are moved from the locking position to the non-locking position by a biasing force of the biasing spring.

7. The cartridge transporting device according to claim 6, wherein as the holder driving member moves in one direction, the cartridge holder is pressed by the holder driving member and moved from the drawn-in position to the insertion position, as the holder driving member moves in other direction, the cartridge holder is pressed by the holder driving member and moved from the insertion position to the drawn-in position, as the holder driving member moves in the one direction, the locking operation portion slides and comes in contact with the two locking members and the two locking members move from the non-locking position to the locking position, and as the holder driving member moves in the other direction, the locking operation portion spaces apart from the two locking members and the two locking members move from the locking position to the non-locking position.

8. The cartridge transporting device according to claim 7, wherein the holder driving member has an unlocking portion, the two locking members are moved from the non-locking position to the locking position by the operation of the locking operation portion, and when the operation of the locking operation portion to the two locking members is removed, the two locking members are moved from the locking position to the non-locking position by the operation of the unlocking portion.

9. The cartridge transporting device according to claim 8, wherein as the holder driving member moves in one direction, the cartridge holder is pressed by the holder driving member and moved from the drawn-in position to the insertion position, as the holder driving member moves in other direction, the cartridge holder is pressed by the holder driving member and moved from the insertion position to the drawn-in position, as the holder driving member moves in the one direction, the locking operation portion slides and comes in contact with the locking members and the locking members move from the non-locking position to the locking position, and as the holder driving member moves in the other direction, the locking operation portion spaces apart from the two locking members, the unlocking portion slides and comes in contact with the two locking members, and the two locking members move from the locking position to the non-locking position.

10. A cartridge transporting device comprising:

a cartridge holder into which a cartridge receiving a recording medium is inserted and which holds the inserted cartridge;

a supporting frame that supports the cartridge holder to freely move between an insertion position where the cartridge is inserted and a drawn-in position where the cartridge is drawn-in from the insertion position;

a locking member that moves between a locking position where the cartridge holder is locked and a non-locking position where the cartridge holder is unlocked, moves to the locking position, and locks the cartridge holder at the insertion position;

a holder driving member that is movable in a predetermined direction and moves the cartridge holder between the insertion position and the drawn-in position; and a moving mechanism that moves the holder driving member in the predetermined direction, wherein when the cartridge holder starts to move from the insertion position to the drawn-in position, the holder driving member moves such that the cartridge holder locked by the locking member is unlocked, and wherein a locking portion of the locking member is elastically deformable, a locked portion of the cartridge holder is formed as a locked hole, and the locking portion is elastically restored from elastic deformation, thereby the locking portion is inserted and engaged with the locked hole.

11. A cartridge transporting device comprising:

a cartridge holder into which a cartridge receiving a recording medium is inserted and which holds the inserted cartridge;

a supporting frame that supports the cartridge holder to freely move between an insertion position where the cartridge is inserted and a drawn-in position where the cartridge is drawn-in from the insertion position;

a locking member that moves between a locking position where the cartridge holder is locked and a non-locking position where the cartridge holder is unlocked, moves to the locking position, and locks the cartridge holder at the insertion position;

a holder driving member that is movable in a predetermined direction and moves the cartridge holder between the insertion position and the drawn-in position; and a moving mechanism that moves the holder driving member in the predetermined direction, wherein when the cartridge holder starts to move from the insertion position to the drawn-in position, the holder driving member moves such that the cartridge holder locked by the locking member is unlocked, and wherein two locking members are provided and moved away from and closer to each other such that the cartridge holder is locked and unlocked.

12. A cartridge transporting device comprising:

a cartridge holder into which a cartridge receiving a recording medium is inserted and which holds the inserted cartridge;

a supporting frame that supports the cartridge holder to freely move between an insertion position where the cartridge is inserted and a drawn-in position where the cartridge is drawn-in from the insertion position;

a locking member that moves between a locking position where the cartridge holder is locked and a non-locking position where the cartridge holder is unlocked, moves to the locking position, and locks the cartridge holder at the insertion position;

a holder driving member that is movable in a predetermined direction and moves the cartridge holder between the insertion position and the drawn-in position; and a moving mechanism that moves the holder driving member in the predetermined direction, wherein when the cartridge holder starts to move from the insertion position to the drawn-in position, the holder driving member moves such that the cartridge holder locked by the locking member is unlocked, and wherein two locking members are provided and moved away from and closer to each other and locking portions of the two locking members are disposed at ends of the two locking members in the directions in which the two locking members are spaced apart from each other.

13. A cartridge transporting device comprising:

a cartridge holder into which a cartridge receiving a recording medium is inserted and which holds the inserted cartridge;

a supporting frame that supports the cartridge holder to freely move between an insertion position where the cartridge is inserted and a drawn-in position where the cartridge is drawn-in from the insertion position;

a locking member that moves between a locking position where the cartridge holder is locked and a non-locking position where the cartridge holder is unlocked, moves to the locking position, and locks the cartridge holder at the insertion position;

a holder driving member that is movable in a predetermined direction and moves the cartridge holder between the insertion position and the drawn-in position; and a moving mechanism that moves the holder driving member in the predetermined direction, wherein when the cartridge holder starts to move from the insertion position to the drawn-in position, the holder driving member moves such that the cartridge holder locked by the locking member is unlocked, wherein the holder driving member has a locking operation portion and a biasing spring that biases two locking members to come closer to each other, wherein the locking members are moved from the non-locking position to the locking position by an operation of the locking operation portion, and wherein when the operation of the locking operation portion to the locking member is removed, the locking members are moved from the locking position to the non-locking position by a biasing force of the biasing spring.

* * * * *